United States Patent [19]

Mizobe et al.

[11] Patent Number: 5,686,032
[45] Date of Patent: Nov. 11, 1997

[54] PROCESS OF FORMING A GASKET DIRECTLY ON WORKPIECE, USING A MOLD CLAMPED TO THE WORKPIECE

[75] Inventors: Tatsuya Mizobe, Chiryu; Masayuki Sumiyoshi, Okazaki; Hiroyuki Miwa, Toyota, all of Japan

[73] Assignee: Toyota Jidosha Kabushiki Kaisha, Toyota, Japan

[21] Appl. No.: 340,414

[22] Filed: Nov. 15, 1994

[30] Foreign Application Priority Data

Nov. 17, 1993 [JP] Japan ................... 5-288046

[51] Int. Cl.⁶ .................... B29C 33/24; B29C 45/77
[52] U.S. Cl. .................. 264/40.3; 264/40.1; 264/267
[58] Field of Search .................... 264/250, 255, 264/259, 266, 102, 40.1, 40.3, 267

[56] References Cited

U.S. PATENT DOCUMENTS

| | | |
|---|---|---|
| 2,976,571 | 3/1961 | Moslo . |
| 2,995,057 | 8/1961 | Nenzell . |
| 4,321,225 | 3/1982 | Jelinek . |
| 5,008,060 | 4/1991 | Kanai et al. ............ 264/255 |
| 5,061,429 | 10/1991 | Yoshihara et al. ....... 264/252 |
| 5,116,556 | 5/1992 | Danton ................. 264/252 |
| 5,158,638 | 10/1992 | Osanami et al. ......... 264/252 |
| 5,171,508 | 12/1992 | Ishizu et al. .......... 264/252 |
| 5,346,657 | 9/1994 | Hara et al. ............ 264/40.1 |
| 5,413,748 | 5/1995 | Garza .................. 264/252 |
| 5,454,991 | 10/1995 | Brew ................... 264/40.1 |

FOREIGN PATENT DOCUMENTS

| | | |
|---|---|---|
| 0 184 211 | 6/1986 | European Pat. Off. . |
| 0 293 954 | 12/1988 | European Pat. Off. . |
| 0 372 899 | 6/1990 | European Pat. Off. . |
| 0 529 087 | 3/1993 | European Pat. Off. . |
| 0 553 486 | 8/1993 | European Pat. Off. . |
| 59-1874 | 1/1984 | Japan . |
| 61-197067 | 9/1986 | Japan . |
| 1-295078 | 11/1989 | Japan . |
| 2-203082 | 8/1990 | Japan . |
| 4-93227 | 3/1992 | Japan . |
| 5-5089 | 1/1993 | Japan . |

OTHER PUBLICATIONS

Patent Abstracts of Japan, vol. 14, No. 81 (M-0935), Feb. 15, 1990, JP-A-01 295 078, Nov. 28, 1989.
Patent Abstracts of Japan, vol. 17, No. 266 (C-1062), May 25, 1993, JP-A-05 005 089, Jan. 14, 1993.

*Primary Examiner*—Angela Ortiz
*Attorney, Agent, or Firm*—Oblon, Spivak, McClelland, Maier & Neustadt, P.C.

[57] ABSTRACT

A process and an apparatus for forming a gasket directly on a workpiece having a joining surface which has an annular gasket-fixing groove, wherein a mold having a gasket-forming groove which cooperates with the gasket-fixing groove to define a cavity for forming the gasket is clamped to the joining surface of the workpiece, and a material is injected into the cavity through an injection passage which is formed through the mold and which communicates with the gasket-forming groove. The material is cured into the gasket, and the mold is removed from the workpiece. The mold may have two elastic sealing members disposed on inner and outer sides of the gasket-forming groove, respectively, so as to extend along the gasket-forming groove, and provide pressure-tight sealing of the cavity when the body is placed on the workpiece such that the sealing members are held in elastic pressure-tight contact with the joining surface.

4 Claims, 30 Drawing Sheets

PROCESS OF FORMING A GASKET DIRECTLY ON WORKPIECE, USING A MOLD CLAMPED TO THE WORKPIECE

BACKGROUND OF THE INVENTION

1. Field of the Invention

The present invention relates to a process of forming or fabricating a gasket directly on a joining surface of a workpiece such that the gasket is partly and fixedly received in a groove formed in the joining surface. The invention also relates to an apparatus suitable for practicing the above process, and a mold used in the apparatus.

2. Discussion of the Related Art

A gasket or elastically deformable packing is used to make a pressure-tight joint between stationary components such as a body of an engine and a head cover. For instance, such a gasket is attached to the joining surface of the head cover. Conventionally, a gasket produced independently of the head cover, typically, a commercially available gasket is fitted in a gasket-fixing groove formed in the joining surface of the head cover. Since the gasket is usually elastically deformable and flexible, it is difficult to automate the operation to attach the gasket, and the operation is performed manually by the worker. The manual attachment of the gasket to the workpiece suffers from a relatively large fluctuation in the condition of fitting of the gasket in the groove, and does not assure satisfactory pressure tightness at the joint.

Techniques to simultaneously form and fix a gasket on the workpiece have been proposed. An example of such techniques is disclosed in JP-A-5-5089, wherein two components or workpieces to be pressure-tightly joined together are assembled such that the joining surfaces define a space, and a suitable material is injected into the space, to form a gasket within the space. JP-A-1-295078 discloses another technique in which a gasket forming groove formed in a mold is filled with a resin material that expands upon curing thereof, and is placed on the workpiece, and the resin material is cured and expanded into a gasket fixed on the workpiece. Since these techniques permit simultaneous formation and fixing of a gasket on the workpiece, the procedure to attach the gasket to the workpiece is eliminated.

In the technique disclosed in JP-A-5-5089 in which the material is injected into the space formed between the joining surfaces of the assembled components or workpieces, it is impossible to check the formed gasket within the assembly, leading to relatively low forming stability or reliability of the gasket. Further, the size of the gasket cannot be larger than that of the space, resulting in insufficient pressure tightness at the joint and leading to a risk of development of a gap at the joint by vibration of the assembly. While the use of a material which expands upon curing thereof is possible, the gasket formed in this case contains a gas, and is not hard enough to assure a desired degree of pressure tightness at the joint.

In the technique disclosed in JP-A-1-295078, on the other hand, air is likely to be trapped in spaces between the material and the surfaces defining the gasket forming groove when the groove is filled with the material before the mold is placed on the workpiece. Further, air if contained in the material cannot be easily removed since the material generally has a high viscosity, and air voids or bubbles tend to exist in the formed gasket, causing a variation in the quality of the gasket. Another drawback of this technique arises from the use of a resin material which expands upon curing. Described more specifically, the gasket formed by expansion of the resin material so as to extend from the joining surface of the workpiece is considerably weak or soft, and does not provide a sufficient degree of pressure tightness at the joint with respect to another component even if the two components are clamped together so as to cause elastic deformation of the gasket. Further, the material is applied to the mold so as to fill the gasket forming groove. It is cumbersome and time-consuming to apply the material to the mold particularly where the gasket to be formed has a complicated three-dimensional configuration.

SUMMARY OF THE INVENTION

It is therefore a first object of the present invention to provide a simple process of simultaneously forming and fixing a gasket on a workpiece, which process assures improved pressure tightness at the joining surface of the workpiece with respect to another component.

It is a second object of the present invention to provide a gasket fabricating apparatus suitable for practicing the process indicated above.

The first object indicated above may be achieved according to a first aspect of the present invention, which provides a process of forming a gasket directly on a workpiece having a joining surface which has an annular gasket-fixing groove, comprising the steps of: (a) preparing a mold having a gasket-forming groove which cooperates with the gasket-fixing groove to define a cavity for forming the gasket; (b) clamping the mold to the joining surface of the workpiece; (c) injecting a material for the gasket into the cavity through an injection passage which is formed through the mold and which communicates with the gasket-forming groove; (d) curing the material injected in the cavity; and (e) removing the mold from the workpiece.

In the present gasket forming process, the gasket is formed directly on the joining surface of the workpiece such that the gasket is partly fixed in the gasket-fixing groove which cooperates with the gasket-forming groove of the mold to form the cavity corresponding to the gasket. Accordingly, the present process does not require a separate or independent step of attaching the gasket to the joining surface of the workpiece, contrary to the conventional process which includes a step of forming a gasket independently of the workpiece and a step of attaching the thus formed gasket to the workpiece. The gasket can be simultaneously formed and fixed on the workpiece, by simply clamping the mold to the joining surface of the workpiece, and injecting the suitable material into the cavity through the injection passage formed through the mold. In the present process, the cavity can be easily and efficiently filled with the material, even where the gasket has a complicated three-dimensional configuration. This is not so in the conventional process in which the material is applied to the gasket-forming groove in the mold before the mold is placed on the workpiece. Further, the present process does not suffer from trapping of air within the material filling the cavity, and thus assures improved quality of the gasket formed of the air-free material. Since the mold has the gasket-forming groove which provides a part of the cavity, the gasket partly received and fixed in the gasket-fixing groove formed in the joining surface of the workpiece extends above the joining surface by an amount corresponding to the depth of the gasket-forming groove. Further, the material need not be expandable upon curing thereof. Therefore, the gasket formed on the workpiece provides a high degree of fluid tightness or pressure tightness when the workpiece and a mating component are clamped together during assembling such that the gasket is elastically compressed against the joining surface of the mating component.

The second object indicated above may be achieved according to a second aspect of this invention, which provides an apparatus for forming a gasket directly on a workpiece having a joining surface which has an annular gasket-fixing groove, comprising: (a) a mold having a gasket-forming groove which cooperates with the gasket fixing groove of the workpiece to define a cavity for forming the gasket when the mold is placed on the joining surface of the workpiece, the mold further having an injection passage which communicates with the gasket-forming groove and through which a material for the gasket is injected into the cavity; (b) a clamping device for clamping the mold to the joining surface of the workpiece; (c) a material feeding device for injecting the material into the cavity through the injection passage; and (d) a curing device for curing the material injected in the cavity.

The gasket forming apparatus of the present invention constructed as described above provides substantially the same advantages as described above with respect to the process of the invention. Briefly, the present apparatus permits a gasket to be simultaneously formed and fixed on the workpiece, by simply clamping the mold to the joining surface of the workpiece by the clamping device, and injecting the suitable material from the material feeding device into the cavity through the injection passage formed through the mold.

According to one preferred form of the apparatus of the present invention, the mold includes a body which is placed on the joining surface of the workpiece and which has the gasket-forming groove and the injection passage, and further includes inner and outer elastic sealing members attached to the body. The inner and outer elastic sealing members are disposed on inner and outer sides of the annular gasket-forming groove, respectively, so as to extend along the gasket-forming groove. The inner and outer elastic sealing members provide pressure-tight sealing of the cavity when the body is placed on the joining surface of the workpiece such that the elastic sealing members are held in elastic pressure-tight contact with the joining surface.

When the present mold is used for forming a gasket, the mold is placed on the joining surface of the workpiece so that the gasket-forming groove of the mold cooperates with the gasket-fixing groove of the workpiece to define the cavity for forming the gasket. Then, the material is injected into the cavity through the injection passage formed through the mold. As a result, the gasket is simultaneously formed and fixed on the joining surface of the workpiece. Thus, the mold provides substantially the same advantage as the gasket forming process described above. Further, the inner and outer elastic sealing members are attached to the body of the mold such that the inner and outer elastic sealing members extend along the gasket-forming groove such that the gasket-forming groove is interposed between the inner and outer elastic sealing members disposed on the respective inner and outer sides of the gasket-forming groove. These elastic sealing members are adapted to be held in elastic pressure-tight contact with the joining surface of the workpiece, for providing pressure-tight sealing of the cavity over the entire periphery of the cavity, without an excessive clamping force between the mold and workpiece, even where the joining surface of the workpiece has some strain, deflection or buckling, or a low degree of surface smoothness. Accordingly, the present mold prevents leakage of the material from the cavity, and permits improved yield ratio of the material, and formation of the gasket having a high degree of consistency in its height, irrespective of deflection or buckling of the joining surface of the workpiece. Moreover, the relatively small clamping force required to obtain sufficient pressure tightness between the mold and workpiece is advantageous in reducing a risk of damaging the workpiece and/or mold, and makes it possible to use a relatively simple and less costly device for clamping the mold to the workpiece.

According to a second preferred form of the apparatus of the invention, the mold includes a body which is placed on the joining surface of the workpiece and which has the gasket-forming groove and the injection passage. The mold further includes inner and outer elastic tubes attached to the body, and further has a fluid passage communicating with the elastic tube. The inner and outer elastic tubes are disposed on inner and outer sides of the gasket-forming groove, respectively, so as to extend along the gasket-forming groove, the inner and outer elastic tubes providing pressure-tight sealing of the cavity when the body is placed on the joining surface of the workpiece such that the elastic tubes are held in elastic pressure-tight contact with the joining surface. In this preferred form of the invention, the apparatus further comprises: (e) a pressurized-fluid supply device connectable to the fluid passage of the body, for supplying the elastic tubes with a pressurized fluid; (f) a first pressure sensor for detecting a pressure of the pressurized fluid in the elastic tubes; (g) a second pressure sensor for detecting an injection pressure of the material; and (h) a controller for controlling at least one of the pressurized-fluid supply device and the material feeding device, such that the pressure of the pressurized fluid detected by the first pressure sensor and the injection pressure of the material detected by the second pressure sensor increase so as to maintain a predetermined relationship therebetween without leakage of the material from the cavity.

In the present gasket forming apparatus constructed according to the above second preferred form of the invention, the pressurized fluid is fed from the pressurized-fluid supply device into the elastic tubes through the fluid passage formed through the mold clamped to the workpiece, so that the elastic tubes inflated by the pressurized fluid provide pressure-tight sealing of the cavity on its inner and outer sides, while the material is injected by the material injecting device into the cavity through the injection passage. As a result, the gasket is simultaneously formed and fixed on the joining surface of the workpiece. Therefore, the present apparatus provides substantially the same advantage described above with respect to the process according to the first preferred form of this invention. Further, the inner and outer elastic tubes provide pressure-tight sealing of the cavity over the entire periphery and on the opposite sides of the cavity, without an excessive clamping force between the mold and workpiece, even where the joining surface of the workpiece has some strain, deflection or buckling, or a low degree of surface smoothness. Accordingly, the mold used in the present apparatus assures improved yield ratio of the material, and provides substantially the same advantage as described above with respect to the mold constructed according to the first preferred form of this invention.

On the other hand, it is noted that as the injection of the material progresses, the resistance to flow or injection of the material through the injection passage into the cavity increases, and the injection pressure of the material accordingly increases. An increase in the injection pressure tends to increase a gap or clearance between the mold and the workpiece, and is likely to cause leakage of the material from the cavity. In view of this tendency, the present apparatus is also adapted to control at least one of the pressurized-fluid supply device and the material feeding device such that the pressure of the pressurized fluid in the elastic tubes and the injection pressure of the material increase so as to maintain or satisfy a predetermined relationship without leakage of the material from the cavity. This arrangement is effective to prevent leakage of the material even in a latter half of the injection period during which the injection pressure of the material is relatively high. Further, the injection of the material can be initiated at a relatively early point of time at which the pressure of the fluid in the elastic tubes is comparatively low. That is, it is not necessary to start the injection of the material only after the pressure of the fluid in the elastic tubes has been raised to a considerably high level which corresponds to a high level of the injection pressure that is expected to be generated in the latter half or terminal portion of the injection period. This arrangement permits reduction of the non-productive time, resulting in reduced overall time required to form the gasket.

The predetermined relationship indicated above between the pressure of the pressurized fluid and the injection pressure of the material can be determined by experiment, for example, on the basis of the required pressure levels of the pressurized fluid which do not cause leakage of the material at different levels of the injection pressure of the material, or on the basis of the allowable levels of the injection pressure which do not cause leakage of the material at different levels of the pressurized fluid pressure. These relationships obtained by experiment may be represented by data maps stored in a memory of the controller. In this case, the controller controls the pressurized-fluid supply device and/or the material feeding device according to the stored data maps. At least one of these devices may be controlled such that if the actual pressure of the pressurized fluid is lower than the required pressure level or if the actual injection pressure is higher than the allowable level, the delivery rate of the pressurized fluid of the pressurized-fluid supply device is increased, or the injection of the material by the feeding device is temporarily interrupted or the amount of the injection is reduced.

In one advantageous arrangement of the apparatus according to the above second preferred form of the invention, the controller comprises means for providing an indication of abnormality associated with the supplying of the elastic tubes with the pressurized fluid, if the pressure of the pressurized fluid detected by the first pressure sensor is lower than a predetermined threshold. In this preferred form of the apparatus, the operator is informed of the presence of any abnormality associated with the supply of the pressurized fluid into the elastic tubes, if the pressure of the pressurized fluid in the elastic tubes is lower than the predetermined threshold level. This arrangement therefore provides for early detection of abnormality such as damage of the elastic tubes or defective connection of the pressurized-fluid supply device to the mold, and is effective to prevent reduction of the yield ratio of the material and defective gasket due to leakage of the material from the cavity. The threshold level may be a fluid pressure level that permits normal injection of the material into the cavity. For instance, the actual pressure of the pressurized fluid is compared with the threshold level when a suitable time has passed after the injection of the material is initiated. The data map stored in the controller to control the pressurized-fluid supply device and/or the material feeding device may be used to compare the actual pressure of the pressurized fluid with the required pressure level indicated above. In this case, the indication of abnormality may be provided if the actual fluid pressure is held lower than the required level for more than a predetermined time, for example.

A third preferred form of the apparatus of the present invention further comprises: (e) a pressure sensor for detecting an injection pressure of the material; (f) an injection amount sensor for detecting an amount of injection of the material by the material feeding device; and (g) means for determining whether the injection pressure of the material detected by the pressure sensor and the amount of injection of the material detected by the injection amount sensor satisfy a predetermined relationship, and providing an indication of abnormality associated with the injection of the material by the material feeding device, if the predetermined relationship is not satisfied.

In the above preferred form of the gasket forming apparatus, the material is injected by the material injecting device into the cavity through the injection passage while the mold is placed on the workpiece. As a result, the gasket is simultaneously formed and fixed on the joining surface of the workpiece. Thus, the present apparatus provides substantially the same advantage as described above with respect to the process of the present invention. Further, the injection pressure of the material is detected by the pressure sensor, while the injection amount of the material is detected by the injection amount sensor, and the detected injection pressure and amount are monitored to determine whether these two parameters satisfy the predetermined relationship, and to provide an indication of abnormality associated with the injection of the material if the predetermined relationship is not satisfied. The present apparatus also permits early detection of abnormality such as leakage of the material, plugging of the injection passage with the material, and defective connection of the material feeding device to the mold, and is effective to prevent reduction of the yield ratio of the material, defective gasket due to the material leakage, and damaging of the material feeding device due to an excessive rise of the injection pressure. The injection pressure increases with an increase in the injecting resistance of the material as the injecting amount increases. The predetermined relationship may be obtained by experiment on the basis of the optimum or required actual injection pressure and amount that are obtained when the apparatus is normally functioning. For example, the actual injection pressure corresponding to a given injection amount is compared with the optimum level. Alternatively, an optimum relationship between the injecting pressure and amount obtained by experiment is stored as a data map, and the actual injection pressure and amount are continuously monitored according to the data map during injection of the material.

A fourth preferred form of the apparatus of this invention further comprises: (e) a pressure sensor for detecting an injection pressure of the material; (f) time measuring means for measuring an injection time of the material which has passed after an operation of the material feeding device is started; and (g) means for determining whether the injection pressure of the material detected by the pressure sensor and the injection time measured by the time measuring means satisfy a predetermined relationship, and providing an indication of abnormality associated with the injection of the material by the material feeding device, if the predetermined relationship is not satisfied.

In the above preferred form of the gasket forming apparatus, the material is injected by the material injecting device into the cavity through the injection passage while the mold is placed on the workpiece. As a result, the gasket is simultaneously formed and fixed on the joining surface of the workpiece. Thus, the present apparatus provides substantially the same advantage as described above with respect to the process of the present invention. Further, the injection pressure of the material is detected by the pressure sensor, while the injection time of the material is detected by the time measuring means, and the detected injection pressure and time are monitored to determine whether these two parameters satisfy the predetermined relationship, and to provide an indication of abnormality associated with the injection of the material if the predetermined relationship is not satisfied. The present apparatus also permits early detection of abnormality such as leakage of the material, plugging of the injection passage with the material, and defective connection of the material feeding device to the mold, and is effective to prevent reduction of the yield ratio of the material, defective gasket due to the material leakage, and damaging of the material feeding device due to an excessive rise of the injection pressure. The injection pressure increases with an increase in the injecting resistance of the material as the injecting time increases. The predetermined relationship may be obtained by experiment on the basis of the optimum or required actual injection pressure and time that are obtained when the apparatus is normally functioning. For example, the actual injection pressure corresponding to a given injection time is compared with the optimum level. Alternatively, an optimum relationship between the injecting pressure and time obtained by experiment is stored as a data map, and the actual injection pressure is continuously monitored according to the data map during injection of the material. The present apparatus according to the fourth preferred form of the invention is advantageous over the apparatus according to the third preferred form of the invention described above.

A fifth preferred form of the apparatus of this invention further comprises: (e) an injection amount sensor for detecting an amount of injection of the material by the material feeding device; (f) time measuring means for measuring an injection time of the material which has passed after an operation of the material feeding device is started; and (g) means for determining whether the amount of injection of the material detected by the injection amount sensor and the injection time measured by the time measuring means satisfy a predetermined relationship, and providing an indication of abnormality associated with the injection of the material by the material feeding device, if the predetermined relationship is not satisfied.

In the above fifth preferred form of the gasket forming apparatus, the material is injected by the material injecting device into the cavity through the injection passage while the mold is placed on the workpiece. As a result, the gasket is simultaneously formed and fixed on the joining surface of the workpiece. Thus, the present apparatus provides substantially the same advantage as described above with respect to the process of the present invention. Further, the injection amount of the material is detected by the injection amount sensor, while the injection time of the material is detected by the time measuring means, and the detected injection amount and time are monitored to determine whether these two parameters satisfy the predetermined relationship, and to provide an indication of abnormality associated with the injection of the material if the predetermined relationship is not satisfied. The present apparatus also permits early detection of abnormality such as leakage of the material, plugging of the injection passage with the material, and defective connection of the material feeding device to the mold, and is effective to prevent reduction of the yield ratio of the material, defective gasket due to the material leakage, and damaging of the material feeding device due to an excessive rise of the injection pressure. The material feeding device may use a piston which is moved with a controlled back pressure. The piston may be moved by a fluid-actuated cylinder which is operated with a pressurized fluid. The pressure of the pressurized fluid to actuate the cylinder may be held constant or varied according to a predetermined pattern as a function of time. The material is injected into the cavity at a comparatively high rate during an initial portion of the injection period in which the injecting resistance of the material is relatively low. The injecting rate of the material is reduced in a latter half or terminal portion of the injection period in which the injecting resistance is relatively high. The predetermined relationship may be obtained by experiment on the basis of the optimum or required actual injection time and amount that are obtained when the apparatus is normally functioning. For example, the actual injection amount corresponding to a given injection time is compared with the optimum value. Alternatively, an optimum relationship between the injecting time and amount obtained by experiment is stored as a data map, and the actual injection amount is continuously monitored according to the data map during injection of the material. The present apparatus according to the fifth preferred form of the invention is advantageous over the apparatus according to the third preferred form of the invention described above.

According to a sixth preferred form of the apparatus of this invention, the mold includes a body which is placed on the joining surface of the workpiece and which has the gasket-forming groove and the injection passage. The body further has an air exhaust passage which is open at one end thereof to a portion of the gasket-forming groove to which the material flowing from the injection passage reaches last. Usually, that portion is most distant from a point of communication of the injection passage with the gasket-forming groove, as measured along the gasket-forming groove. The air exhaust passage is open at the other end thereof to an ambient atmosphere.

When the present mold is used for forming a gasket, the mold is placed on the joining surface of the workpiece such that the gasket-forming groove of the mold cooperates with the gasket-fixing groove of the workpiece to define the cavity for forming the gasket. In this condition, the material is injected into the cavity through the injection passage. As a result, the gasket is simultaneously formed and fixed on the joining surface of the workpiece. Thus, the present mold also provides substantially the same advantage as described above with respect to the process of the invention. Further, the air exhaust passage which is formed through the mold and open to the atmosphere at one end thereof is open at the other end to a portion of the gasket-forming groove which is most distant from the point of communication of the injection passage with the gasket-forming groove, as measured along the gasket-forming groove. In other words, the air exhaust passage is open to a portion of the gasket-forming groove at which two flows of the material from the injection passage through respective two parts of the annular gasket-forming groove merge immediately before the cavity is filled with the material. Air remains at that portion of the gasket-forming groove, by the time just before the cavity is filled. Accordingly, as the amount of the material injected into the cavity increases, an entire volume of the air in the cavity is forced out through the air exhaust passage. This arrangement prevents air voids left in the gasket, and facilitates the injection of the material. The provision of the air exhaust passage is effective to prevent the air voids particularly where the mold has elastic sealing members such as elastic tubes according to the first or second preferred form of the invention described above, which are held in pressure-tight contact with the joining surface of the workpiece to provide an excellent pressure-tight sealing of the cavity.

In one advantageous arrangement of the apparatus according to the above sixth preferred form of the invention, the body incorporates a filter at one end of the air exhaust groove at which the air exhaust passage communicates with the gasket-forming groove. The filter permits a flow of air therethrough and inhibiting a flow of the material therethrough. The filter eliminates or minimizes leakage of the material through the air exhaust passage, thereby improving the yield ratio of the material. Further, the provision of the filter to minimize the material leakage through the air exhaust passage permits the air exhaust passage to have a relatively large size at its open end open to the gasket-forming groove. The relatively large opening of the air exhaust passage accommodates a possible variation in the position of the gasket-forming groove at which the two flows of the materials from the injection passage merge. Therefore, the air can be exhausted through the air exhaust passage under any injecting condition, whereby the gasket formed is less likely to have air voids. The filter is preferably a porous metal or ceramic structure or a metal fiber felt.

The first object indicated above may also be achieved according to a third aspect of this invention, which provides a process of forming a gasket directly on a workpiece having a joining surface which has an annular gasket-fixing groove, the process comprising the steps of: (a) preparing a mold having a gasket-forming groove which cooperates with the gasket-fixing groove to define a cavity for forming the gasket; (b) clamping the mold to the joining surface of the workpiece; (c) providing the mold with an air exhaust passage which is open at one end thereof to the gasket-forming groove; (d) connecting an evacuating device to the other end of the air exhaust passage, and operating the evacuating device to evacuate the cavity through the air exhaust passage; (e) injecting a material for the gasket into the cavity through an injection passage which is formed through the mold and which communicates with the gasket-forming groove; (f) curing the material injected in the cavity; and (g) removing the mold from the workpiece.

In the above process according to the third aspect of the invention, the cavity formed by the workpiece and the mold clamped to the workpiece is evacuated through the air exhaust passage. Hence, the present process prevents the formation of air voids in the gasket and facilitates the injection of the material, as well as provides substantially the same advantage as described above with respect to the process according to the first aspect of the invention. The present process is advantageously practiced with the mold having elastic sealing members according to the first or second preferred form of this invention.

While the evacuation of the cavity may be effected before the injection of the material into the cavity, the evacuation may be effected concurrently with the material injection. In this case, the air exhaust passage is preferably open to a portion of the gasket-forming groove which is most distant from the opening of the injection passage. Where the cavity is evacuated prior to the material injection, the air exhaust passage may be open to any portion of the gasket-forming groove. As described above with respect to the mold according to the sixth preferred form of the invention, a filter is desirably disposed at an end portion of the air exhaust passage on the side of the gasket-forming groove.

One preferred form of the process according to the above aspect of the invention further comprises the steps of measuring an evacuating time which has passed after an operation of the evacuating device is started, detecting a pressure in the cavity while the evacuating device is in operation, determining whether the evacuating time and the pressure in the cavity satisfy a predetermined relationship, and providing an indication of abnormality associated with evacuation of the cavity, if the predetermined relationship is not satisfied.

In the above preferred form of the process, the evacuation of the cavity is monitored by determining whether the evacuating time after the start of the evacuation and the pressure in the cavity satisfy the predetermined relationship. This arrangement provides for early detection of abnormality associated with the evacuation of the cavity, such as insufficient sealing between the mold and the joining surface of the workpiece, and damage of the elastic sealing members as used according to the first or second preferred form of the invention described above. Thus, the present process prevents reduction of the yield ratio of the material or defective gasket due to leakage of the material. The pressure in the cavity decreases as a function of the evacuating time. The predetermined relationship may be obtained by experiment on the basis of the optimum or required actual evacuating time and the cavity pressure that are obtained when the evacuation is normally effected. For example, the actual cavity pressure corresponding to a given injection time is compared with the optimum level. Alternatively, an optimum relationship between the evacuating time and the cavity pressure obtained by experiment is stored as a data map, and the actual evacuating time and cavity pressure are continuously monitored according to the data map during injection of the material.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
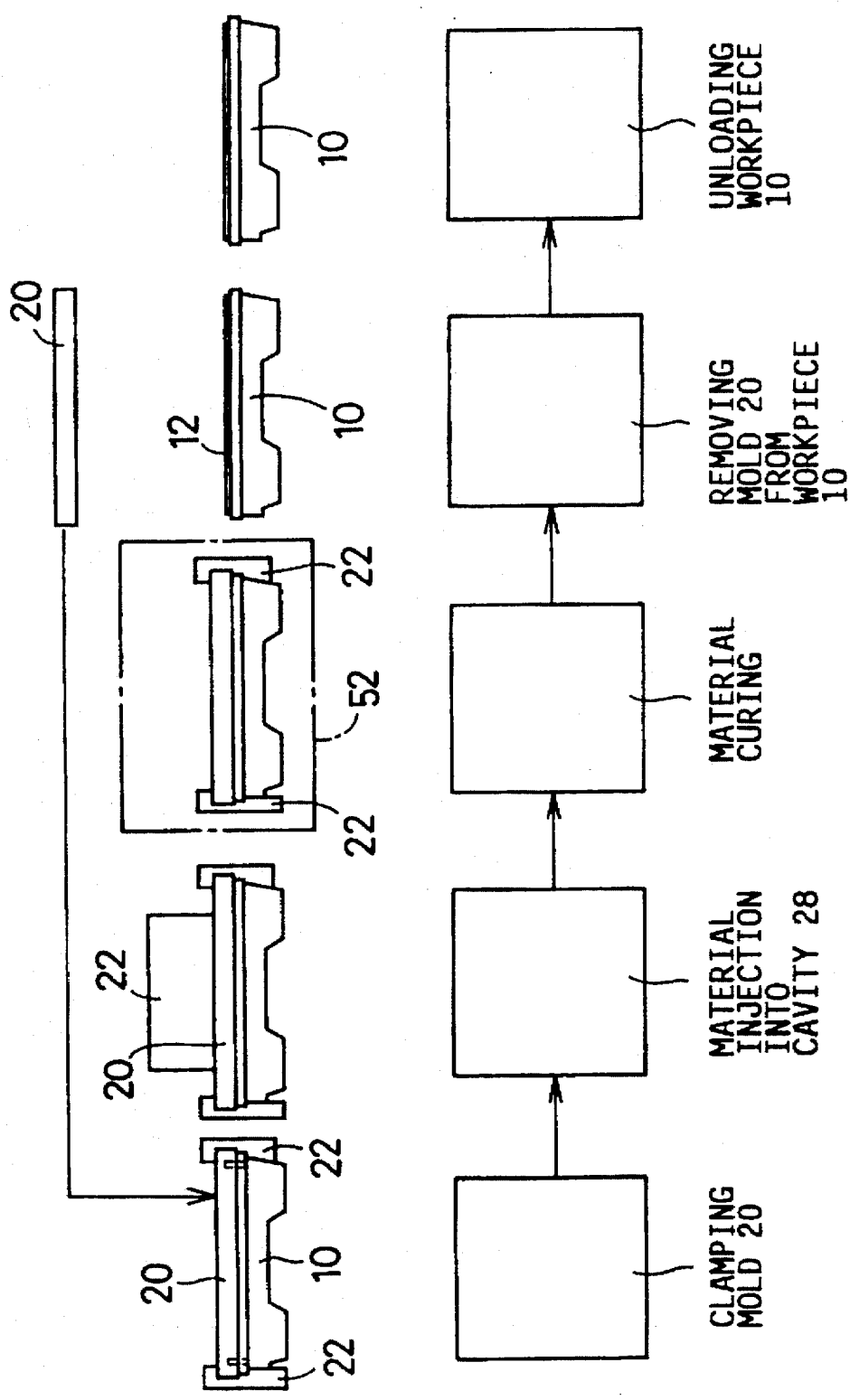
FIGS. 1(a) through 1(e) are views indicating process steps in a process of forming a gasket on a subject component or workpiece according to one embodiment of the present invention.
Figure 2:
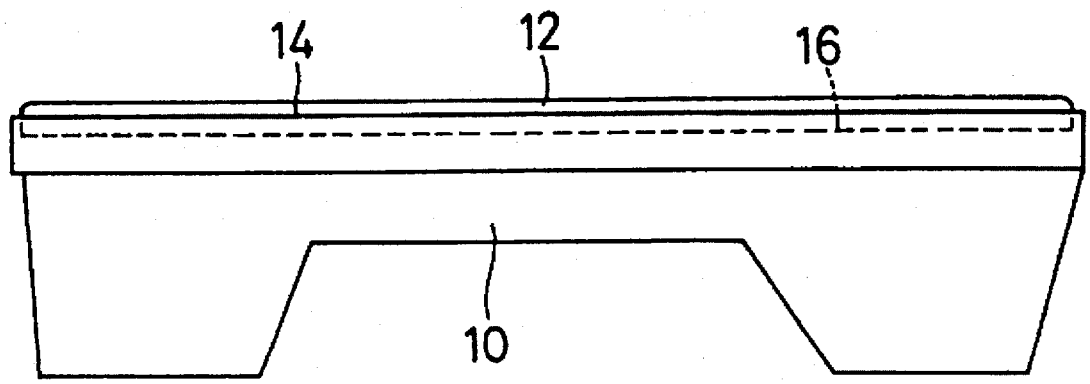
FIG. 2 is a front elevational view of an engine head cover as the workpiece on which the gasket is formed according to the method of FIGS. 1(a)–1(e)

Referring first to FIGS. 1(a) through 1(e), there will be briefly described process steps for eventually forming or fabricating a gasket 12 on a workpiece in the form of a head cover 10 of a motor engine, as shown in FIG. 2. The head cover 10 has a joining surface 14 at which the head cover is pressure-tightly fixed to the body of the engine. The joining surface 14 has a generally annular or closed-loop gasket-fixing groove 16 in which the gasket 12 is partly received. As indicated in FIG. 2, the gasket 12 is formed so as to partly extend above the joining surface 14.

In the process step of FIG. 1(a), a mold 20 for forming the gasket 12 is placed on the joining surface 14 of the head cover 10, and the mold 20 and the head cover 10 are clamped together by a suitable fixture 22 under pressure. The fixture 22 is a clamping device for holding the mold 20 and the head cover 10 together without a gap therebetween in the following material injecting step of FIG. 1(b) and material firing or curing step of FIG. 1(c). For instance, the fixture 22 may consists of an internal force type clamping device such as a toggle clamp, and/or an external force type clamping device such as a hydraulic clamp adapted to hold the mold 20 in the material injection step of FIG. 1(a). Where the head cover 10 and mold 20 are moved from one station to another for the different process steps while being clamped together, it is desirable to use only the internal force type clamp.

Figure 3:
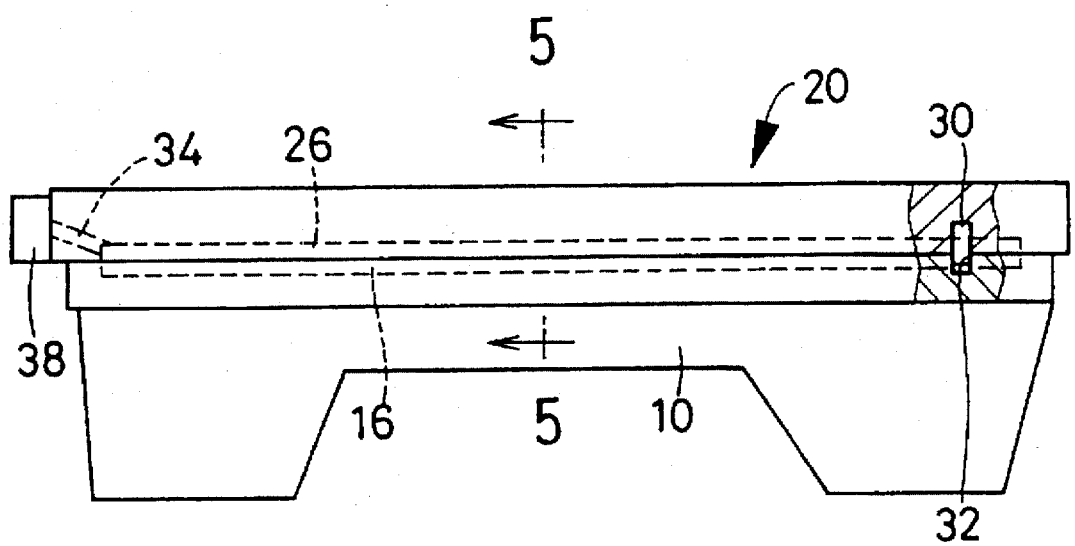
FIG. 3 is a partly cut-away, front elevational view of the head cover on which a mold for forming the gasket is superposed in the method of FIG. 1.

The mold 20 clamped to the head cover 10 in the clamping step of FIG. 1(a) is shown in FIG. 3. The mold 20 has a joining surface 24 for pressure-tight contact with the joining surface 14 of the head cover 10. The joining surface 24 is shown in the bottom plan view of the mold 20 in FIG. 4. The joining surfaces 14 and 24 of the head cover 10 and mold 20 are also shown in the cross sectional view of FIG. 5 taken along line 5—5 of FIG. 3. As is apparent from FIGS. 3–5, the mold 20 has a gasket-forming groove 26 formed in its joining surface 24. The gasket-forming groove 26 cooperates with the gasket-fixing groove 16 to define a gasket-forming cavity 28 when the mold 20 is clamped to the head cover 10 in a predetermined relationship. The gasket-forming groove 26 has a cross sectional shape corresponding to the desired shape of the gasket 12 to be formed, more precisely, corresponding to the desired shape of a part of the gasket 12 which extends above the joining surface 14 of the head cover 10. In the present embodiment, the gasket-forming groove 26 has a substantially semicircular shape as seen in FIG. 5.

The mold 20 has a plurality of positioning pins 30 formed on the joining surface 24, while the head cover 10 has corresponding pin holes 32 formed in the joining surface 14, so that the mold 20 and the head cover 10 are positioned relative to each other by engagement of these positioning pins 30 and holes 32, as indicated in FIG. 3. The positioning holes 32 may be the holes provided for engagement with positioning pins which are provided on the engine body for attaching the head cover 10 to the engine body with the gasket 12 interposed therebetween. Alternatively, the mold 20 may be formed for engagement with a peripheral portion of the head cover 10 for positioning of the mold 20 and head cover 10 relative to each other. Further, the fixture 22 may be adapted to position the mold 20 and head cover 10 relative to each other.

Figure 4:
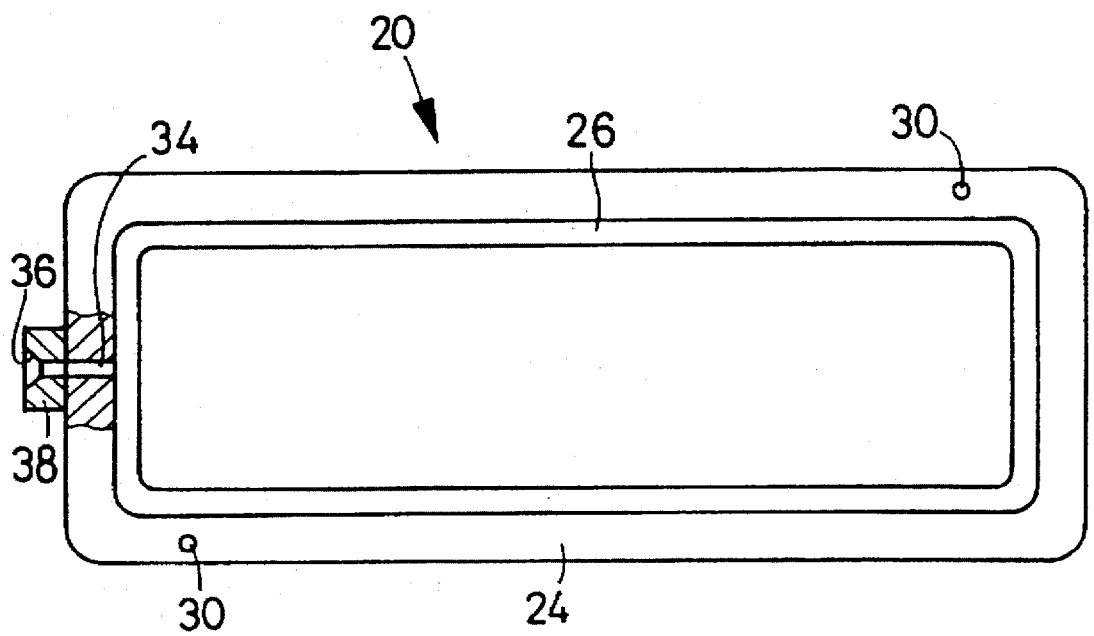
FIG. 4 is a partly cut-away bottom plan view of the mold of FIG. 3.
Figure 5:
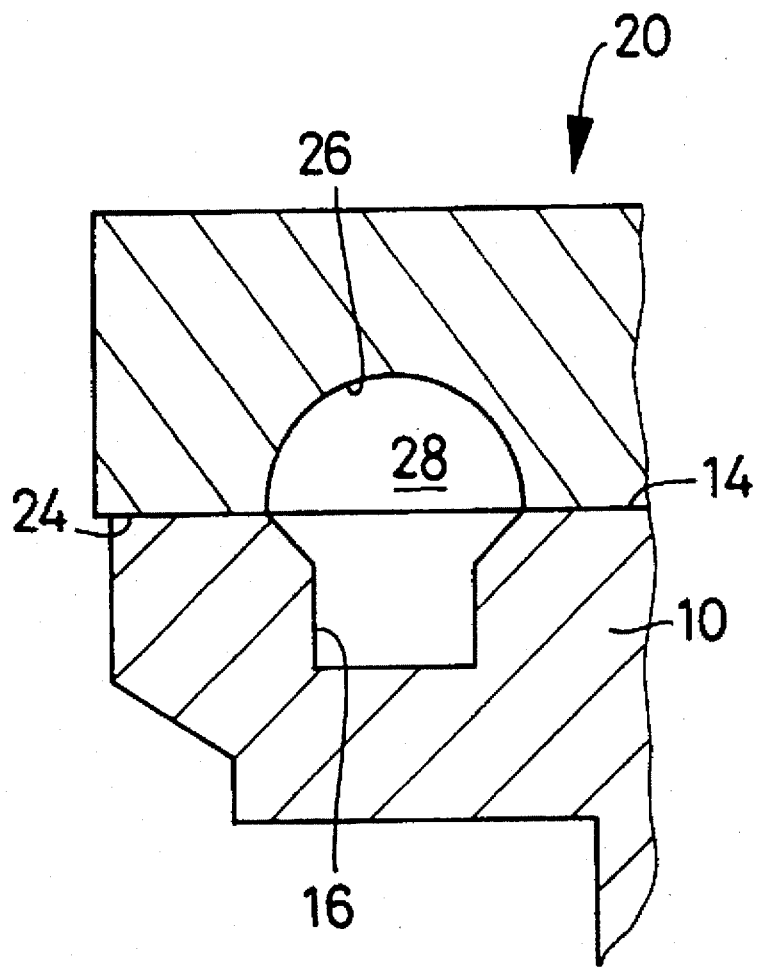
FIG. 5 is an elevational view in cross section taken along line 5—5 of FIG. 3.

The mold 20 has an injection passage 34 open to the gasket-forming groove 26, and a connector 38 attached thereto for communication with the passage 34, as indicated in FIGS. 3 and 4. The connector 38 has an inlet 36 at one end thereof remote from the outer end of the passage 34.

Figure 6:
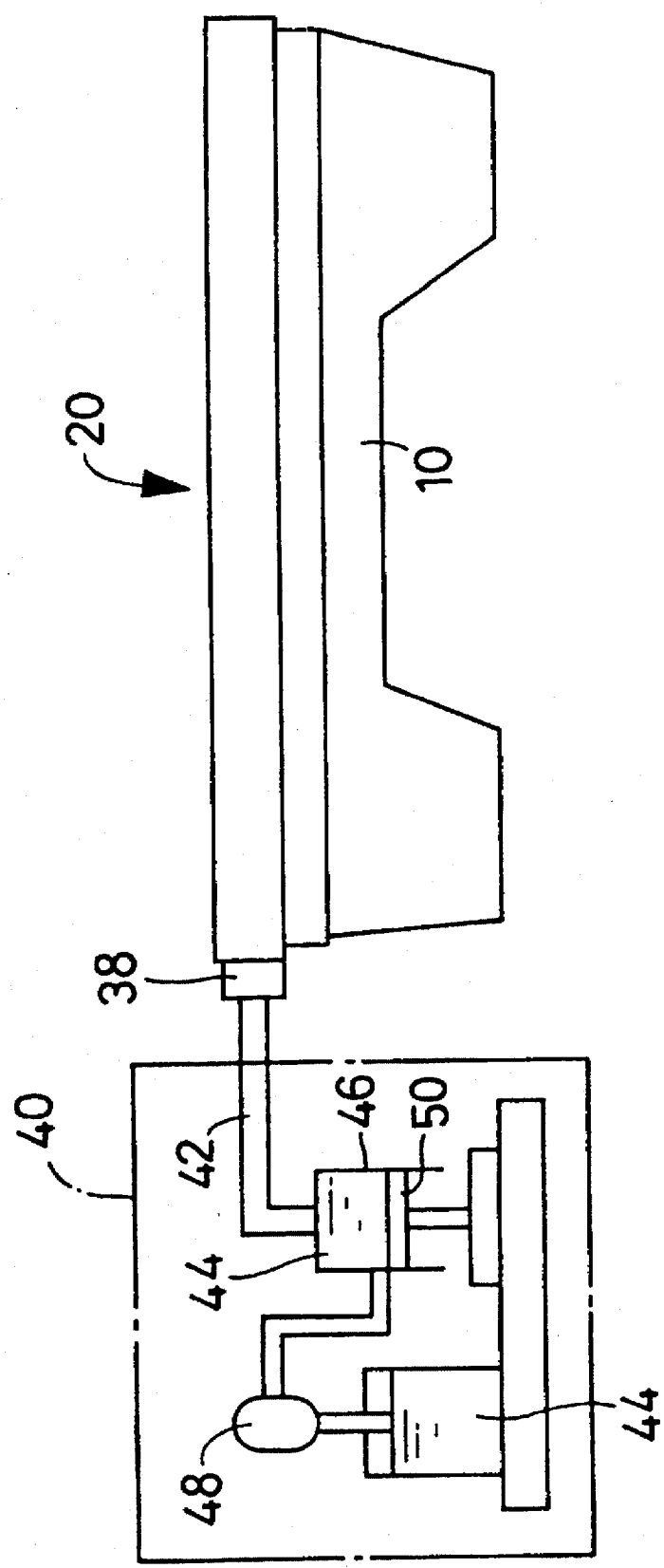
FIG. 6 is a view illustrating the mold as connected to a material feeding or injecting device in the step of FIG. 1(b)

Referring back to FIG. 1(b), a material for forming the gasket 12 is injected into the cavity 28 through the inlet 36 and passage 34 while the mold 20 is clamped to the head cover 10 by the fixture 22. To this end, a material feeding device 40 is connected to the connector 38, as shown in FIG. 6. The material feeding device 40 includes a connecting tube 42 for connection to the connector 38, a feed cylinder 46 for forcing the material (indicated at 44 in FIG. 6) into the connecting tube 42, and a pump 48 (pale pump) for delivering the material 44 from a suitable reservoir to the feed cylinder 46. The connecting tube 42 is adapted for pressure-tight or fluid-tight connection with the connector 38 with a suitable sealing member (e.g., rubber seal), by simply forcing the connecting tube 42 onto the connector 38. However, the tube 42 may be connected to the connector 38 by a mechanical device such as threaded members.

The feed cylinder 46 has a piston 50 and is designed so that one movement of the piston 50 to its elevated position causes the material 44 to be fed by an amount necessary for fabricating one gasket 12, that is, for forming the gasket 12 on one workpiece (head cover 10). The piston 50 is activated by suitable drive means such as a motor 89 and a feed screw rotated by the motor 89, which are provided in a material feeding device 88 used in a gasket fabricating system of FIG. 13. Alternatively, the piston 50 is reciprocated by a pneumatically or hydraulically operated cylinder 114 provided in a material feeding device 112 used in a gasket fabricating system of FIG. 25. These systems of FIGS. 13 and 25 will be described later.

The material 44 may be a liquid rubber material such as a liquid silicone rubber and a liquid acrylic rubber, which can be injected into the cavity 28 through the injection passage 34 and which can be cured into the gasket 12.

In the step of FIG. 1(c), the material 44 injected into the cavity 28 is hardened or cured in a curing device 52. To this end, the head cover 10 and the mold 20 which are clamped together by the fixture 22 are disconnected from the material feeding device 40, and are introduced into the curing device 52. Since the material 44 has a comparatively high viscosity value, the material 44 will not be discharged from the cavity 28 through the injection passage 34 even after the connecting tube 42 is disconnected from the connector 38. The curing device 52 is designed depending upon the properties of the material 44 to be used. For example, the curing device 52 may be a hot-air furnace, a high-frequency heating device or a far-infrared heating device, where the material 44 is a heat-curable material, that is, curable by exposure to heat. Where the material 44 is a UV-curable material, that is, curable by exposure to ultraviolet radiation, a UV generator may be used as the curing device 52. Where the material 44 is heat-curable, the mold 20 is desirably formed of a heat-resistant metal or synthetic resin material. Where the material 44 is UV-curable, the mold 20 is desirably formed of an acrylic or polycarbonate resin, a glass or other material which transmits ultraviolet radiation.

In the step of FIG. 1(d), the head cover 10 and the mold 20 are taken out of the curing device 52 after the material 44 has been cured, and the mold 20 is removed from the head cover 10 by operating the fixture 22 to its unclamping position. With the mold 20 removed from the head cover 10, the gasket 12 formed by curing the material 44 within the cavity 28 is partly exposed on the joining surface 14 of the head cover 10, while it is partly accommodated in the gasket-fixing groove 16. Thus, the head cover 10 with the gasket 12 formed on its joining surface 14 is obtained, as shown in FIG. 2. In this respect, it is noted that the gasket-fixing groove 16 is shaped for more difficult removal of the gasket 12 or material 44 from the groove 16 than from the gasket-forming groove 26 in the mold 20, and that the surface defining the groove 26 is coated with a suitable mold release agent for facilitating the removal of the material 44 therefrom. Therefore, the gasket 12 is retained on the head cover 10 when the mold 20 is removed from the head cover 10. The surface of the groove 26 in the removed mold 20 is coated with a mold release agent, and the mold is returned to the station of the mold clamping step of FIG. 1(a), while the head cover 10 with the gasket 12 formed thereon is cooled as needed, and moved to the next station in which the head cover 10 is subjected to another process step as indicated at FIG. 1(e).

In the gasket fabricating process described above, the gasket 12 is fixed in the groove 16 in the head cover 10 while the gasket 16 is formed by the mold 20 placed on the head cover 10. Thus, it is not necessary to first fabricate a gasket separately from or independently of the head cover, and then attach the gasket to the head cover 10. That is, the present process does not require a separate cumbersome, time-consuming step of attaching the gasket 12 to the head cover 10. The gasket 12 is simultaneously formed and fixed on the joining surface 14 of the head cover 10, by simply clamping the mold 20 onto the head cover 10 and injecting the material 44 into the cavity 28 defined by the mold 20 and head cover 10. The present process permits easier and more efficient fabrication of the high-quality gasket 12 with improved stability without undesirable trapping of air within the material 44 during injection, even if the gasket 12 has a complicated three-dimensional configuration, than the conventional process in which the gasket-forming groove 26 is first filled with the material 44 and then the mold 20 is superposed on the head cover 10 before the material is cured. Further, the gasket 12 partly accommodated in the fixing groove 16 formed in the head cover 10 is partly exposed extending from the joining surface 14 by a distance corresponding to the depth of the gasket-forming groove 26 formed in the mold 20. Accordingly, the material 44 of the gasket 12 need not be a material which expands upon curing thereof, and the exposed portion of the gasket 12 is elastically compressed upon attachment of the head cover 10 to the body of the engine, whereby a comparatively high degree of pressure tightness is obtained between the head cover 10 and the engine body.

Figure 7:
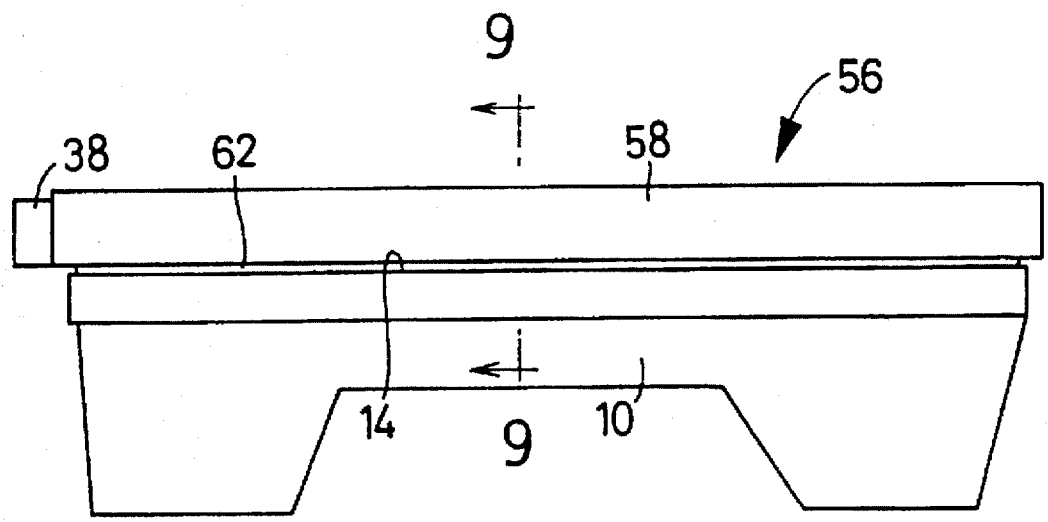
FIG. 7 is a front elevational view showing a mold constructed according to another embodiment of the invention, as superposed on the workpiece in the form of an engine head cover.
Figure 8:
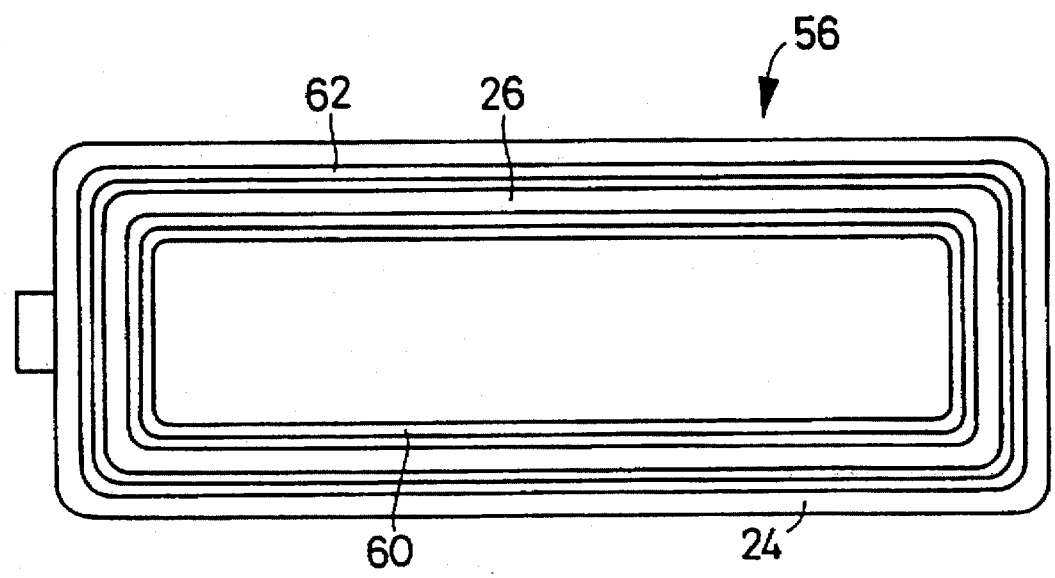
FIG. 8 is a bottom plan view of the mold shown in FIG. 7.
Figure 9:
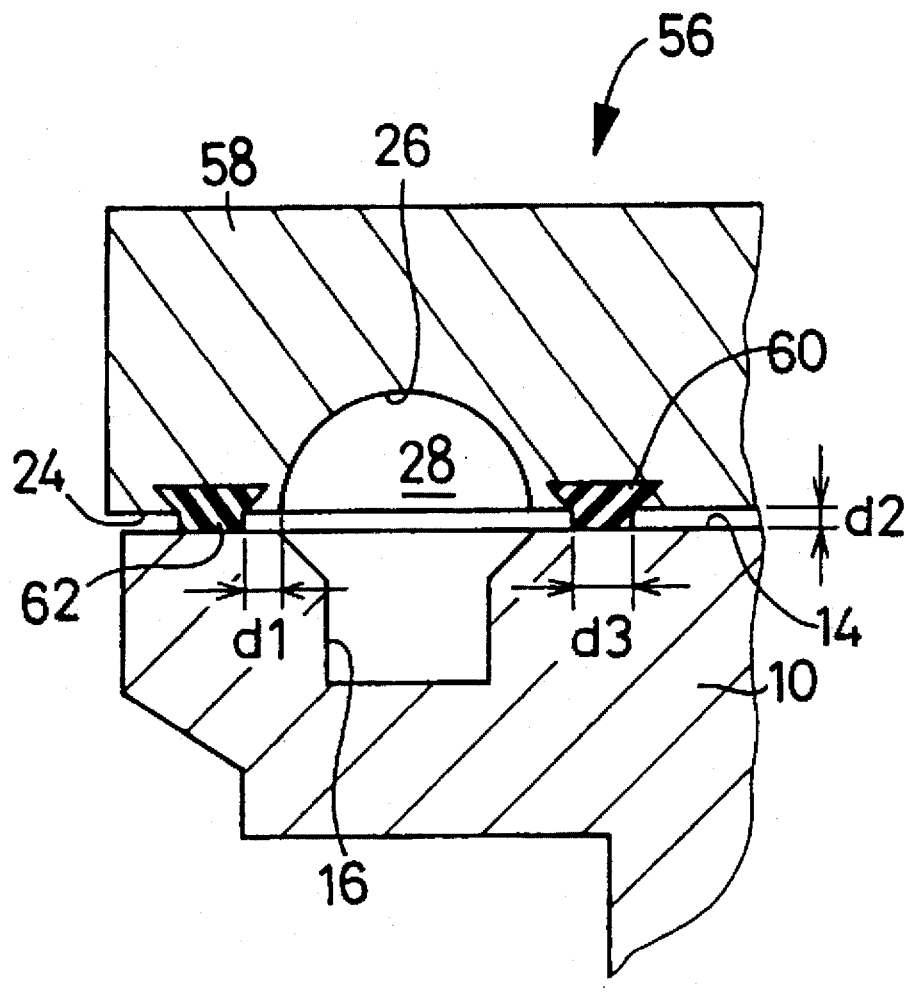
FIG. 9 is a fragmentary elevational view in cross section taken along line 9—9 of FIG. 7.

Referring next to FIGS. 7–9, there will be described a second embodiment of this invention. In these figures, the same reference numerals as used in FIGS. 1–6 will be used to identify the corresponding components, and no redundant description of these components will be provided, in the interest of brevity and simplification.

The embodiment of FIGS. 7–9 uses a mold 56 different from the mold 20 in the first embodiment. As shown in FIGS. 7–9 corresponding to FIGS. 3–5, the mold 56 includes a body 58 and a pair of elastic sealing members 60, 62 disposed on the joining surface 24 of the body 58. The body 58 has the gasket-forming groove 26, injection passage 34 and connector 38, which have been described above. The elastic sealing members 60, 62 are adapted to be held in elastic pressure-tight contact with the joining surface 14 of the head cover 10, and cooperate with the grooves 26, 16 to define the pressure-tight cavity 28. The sealing members 60, 62 are partly received and bonded in respective generally annular inner and outer grooves formed along the annular groove 26 in the joining surface 24, as indicated in FIG. 8. The inner and outer grooves take the form of an inverted trapezoid in cross section as indicated in FIG. 9. The material of the elastic sealing members 60, 62 is selected so that the material does not disturb the curing of the material 44 for the gasket 12, and has a sufficiently high heat resistance where the material 44 is heat-curable. Where the material 44 is a heat-curable liquid silicone rubber material, a fluoro rubber (rubber containing fluorine) is preferably used as the material of the sealing members 60, 62. Where the material 44 is a liquid acrylic rubber, an ordinary acrylic rubber or nitrile rubber may be used for the sealing members 60, 62. To minimize an influence of the sealing members 60, 62 on the height and cross sectional shape of the gasket 12 to be formed, dimensions d1, d2 and d3 of the sealing members 60, 62 as indicated in FIG. 9 should preferably be determined as follows:

d1=about 1–2 mm
d2=about 0.5 mm
d3=about 2–3 mm
where
d1: distance between the free end of the sealing members 60, 62 and the edge of the groove 26;
d2: distance of extension of the sealing members 60, 62 from the joining surface 24 before the mold 56 is clamped to the head cover 10; and
d3: width of the sealing members 60, 62 at their lower end face.

Thus, the mold 56 has the inner and outer elastic sealing members 60, 62 formed on the inner and outer sides of the gasket-forming groove 26, so that the sealing members 60, 62 are elastically compressed against the joining surface 14 of the head cover 10 when the mold 56 is clamped to the head cover 10, whereby fluid-tight or pressure-tight sealing is provided between the joining surfaces 14 and 24 over the entire periphery of the cavity 28, so as to assure the pressure-tight cavity 28, without an excessive clamping force between the mold 56 and head cover 10, even if the joining surface 14 has some strain, deflection or buckling, or poor surface smoothness. Accordingly, the elastic sealing members 60, 62 prevent leakage of the material 44 from the cavity 28, and thereby increases the yield ratio of the material 44. Further, the sealing members 60, 62 assures a high degree of consistency of height of the gaskets 12 to be formed, irrespective of strain, deflection or buckling of the head cover 10. Moreover, a relatively small clamping force required to provide pressure-tight sealing between the joining surfaces 14, 24 eliminates a risk of damaging of the head cover 10 and mold 56, and simplifies the construction of the clamping fixture 22, leading to reduction of the cost of manufacture of the fixture 22.

Figure 10:
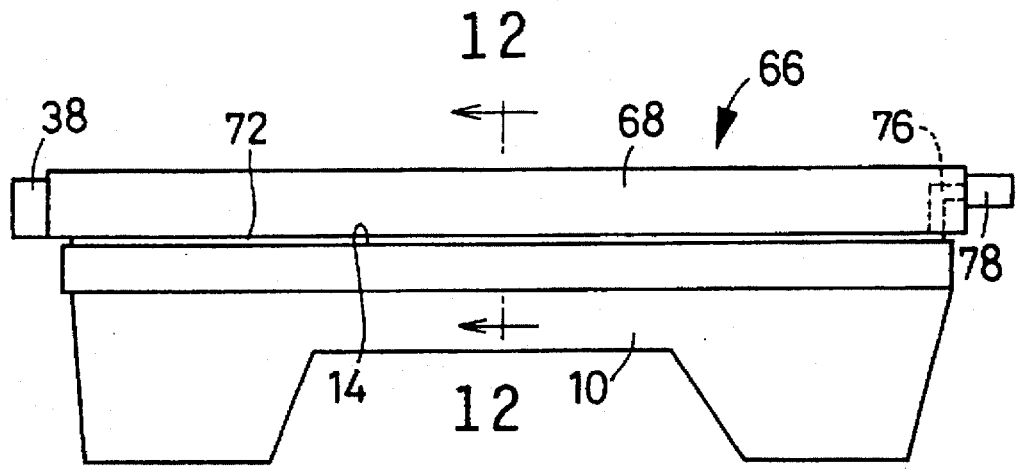
FIG. 10 is a front elevational view showing a mold according to a further embodiment of the invention.
Figure 11:
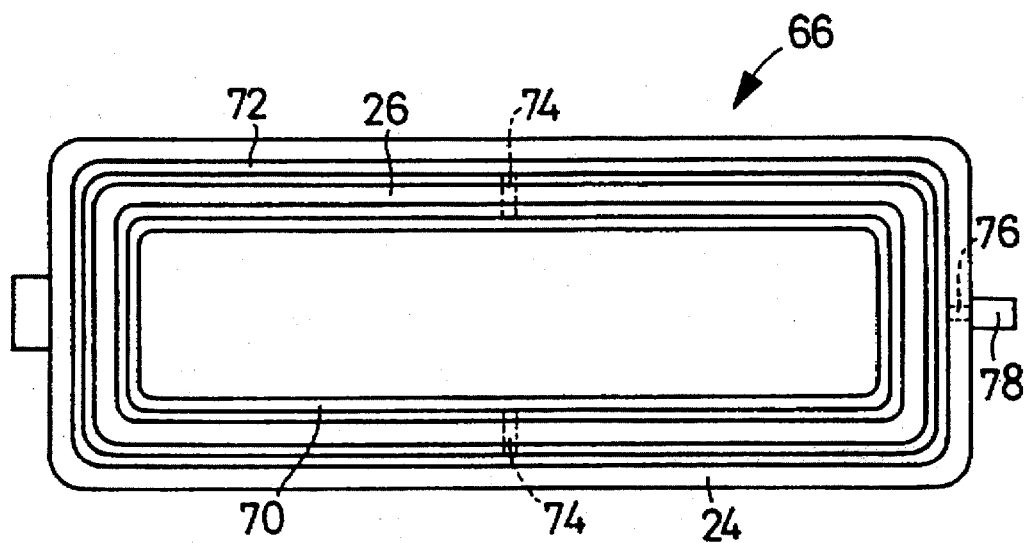
FIG. 11 is a bottom plan view of the mold of FIG. 10.
Figure 12:
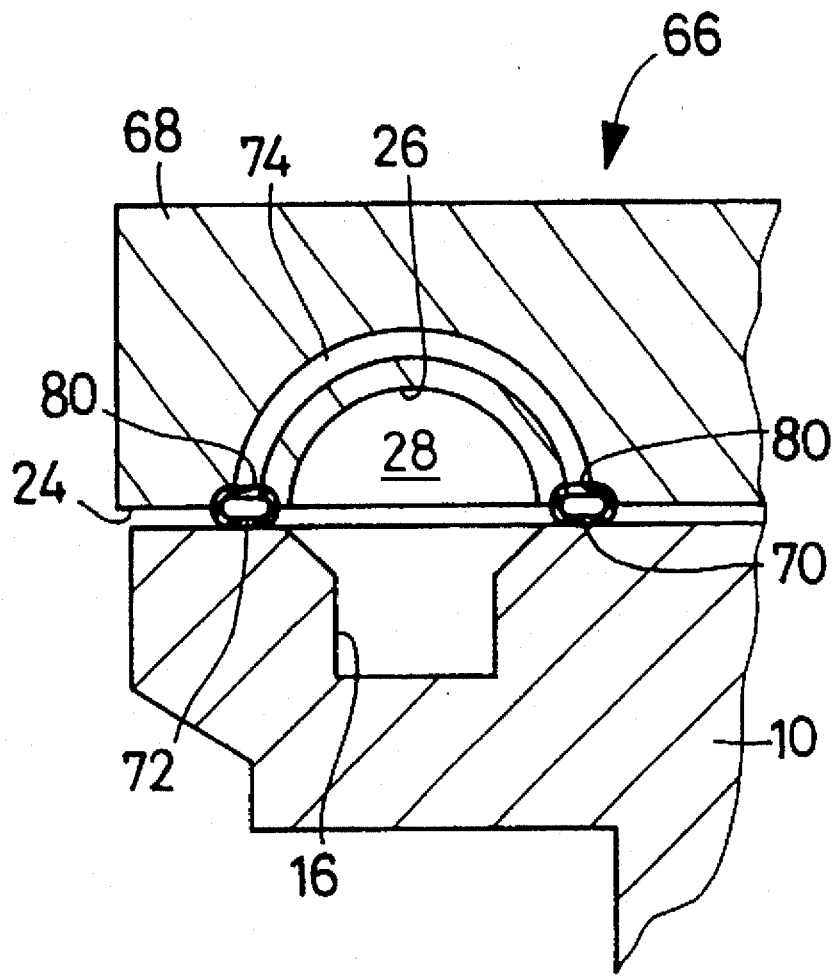
FIG. 12 is a cross sectional view taken along line 12—12 of FIG. 10.

Reference is now made to FIGS. 10–12 corresponding to FIGS. 3–5, which show a third embodiment of this invention. The present embodiment uses a mold 66 which includes a body 68, and elastic sealing members in the form of a pair of rubber tubes 70, 72 disposed on the joining surface 24 of the body 68. The body 68 has the gasket-forming groove 26, injection passage 34 and connector 38 as described above with respect to the first embodiment. The rubber tubes 70, 72 are partly received and bonded in respective inner and outer generally annular grooves formed along the groove 26 in the joining surface 24, as indicated in FIG. 11. Like the elastic members 60, 62, the rubber tubes 70, 72 are adapted to be held in elastic pressure-tight contact with the joining surface 14 of the head cover 10, and cooperate with the head cover 10 to define the pressure-tight cavity 28. The material of the rubber tubes 70, 72 is selected in the same manner as described above with respect to the elastic sealing members 60, 62. That is, the material of the rubber tubes 70, 72 should not disturb the curing of the material 44, and should have sufficient heat resistance where the material 44 is heat-curable. Where the material 44 is a heat-curable liquid silicone rubber material, for example, a fluoro rubber is preferably used as the material of the rubber tubes 70, 72. To minimize an influence of the rubber tubes 70, 72 on the height and cross sectional shape of the gasket 12, the rubber tubes 70, 72 should preferably be positioned and dimensioned substantially as described above with respect to the sealing members 60, 62.

Figure 13:
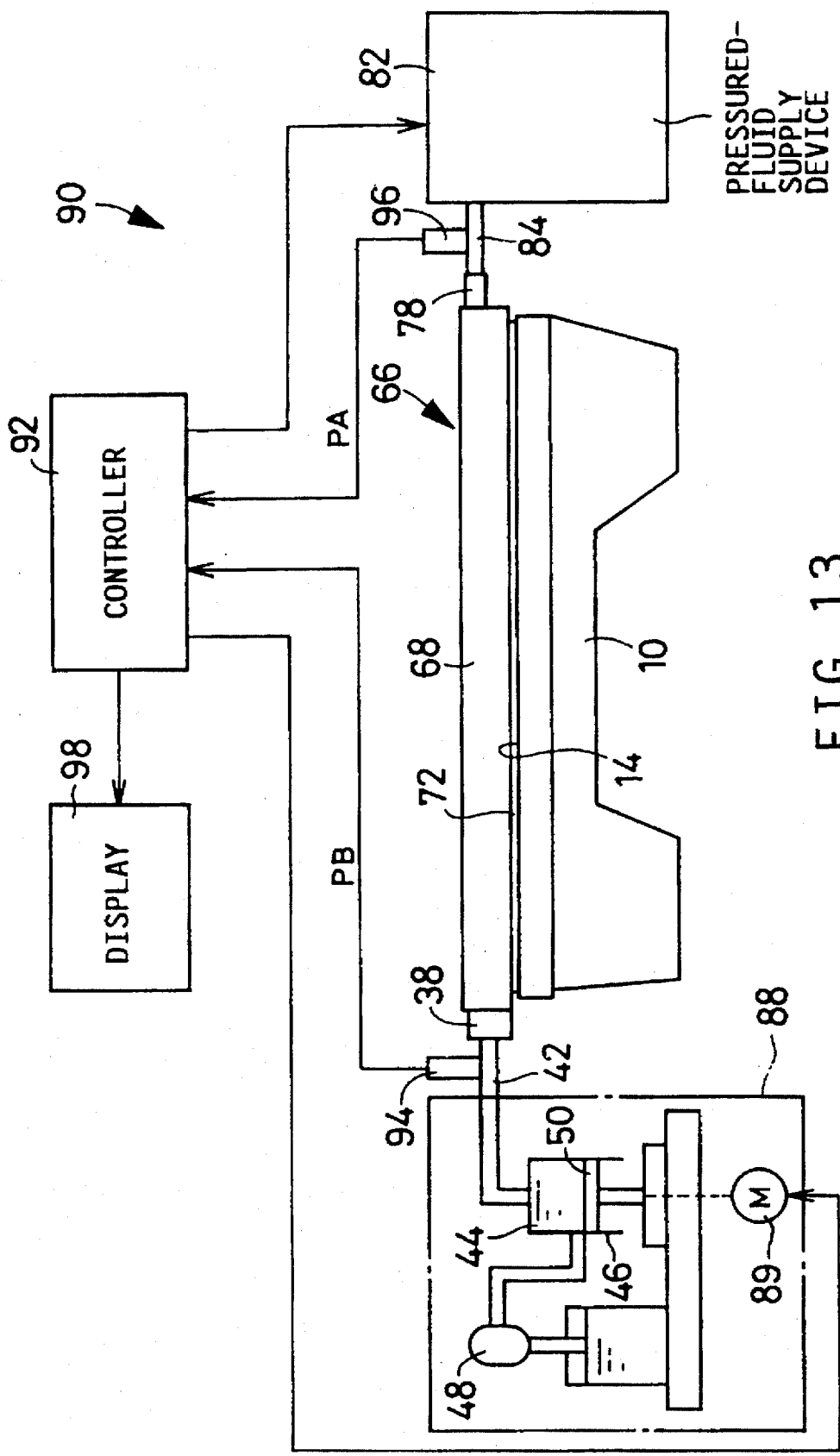
FIG. 13 is a schematic view illustrating a gasket fabricating system according to a still further embodiment of the invention.
Figure 17:
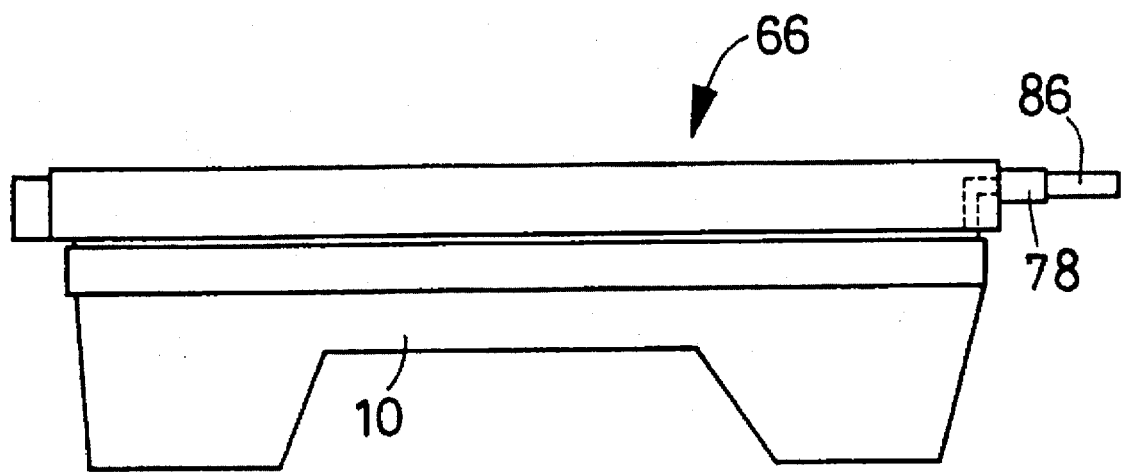
FIG. 17 is a front elevational view showing the mold to which an air bleeder joint is connected after the material is cured, in the gasket fabricating system of FIG. 13.

The two rubber tubes 70, 72 communicate with each other by two communication passages 74, 74 formed in the body 68. The outer rubber tube 72 communicates with a fluid passage 76 formed in the body 68, and the fluid passage 76 communicates with a connector 78 attached to the body 68. The rubber tubes 70, 72 have openings 80 at which the tubes 70, 72 are connected to the communication passages 74 and fluid passage 76. The connector 78 is connectable to a connecting tube 84 of a pressurized-fluid supply device 82 (air compressor) as shown in FIG. 13, and to an air bleeder joint 86 as shown in FIG. 17, for example. The connector 78 is designed to be open when it is connected to the connecting tube 84 or air bleeder joint 86, but closed when it is disconnected from the tube 84 or joint 86, so that the pressurized air introduced in the rubber tubes 70, 72 is held therein. The rubber tubes 70, 72 are elastically expanded by the pressurized air introduced therein, so that the expanded tubes 70, 72 are elastically forced against the joining surface 14 of the head cover 10. The number and position of the communication passages 74 connecting the inner and outer tubes 70, 72 may be changed as needed. The fluid passage 76 may be formed in communication with the communication passages 74.

For instance, the mold 66 of FIGS. 10–12 may be used in a gasket fabricating system 90 shown in FIG. 13, which is constructed according to a fourth embodiment of the present invention. After the mold 66 is clamped to the head cover 10 by the fixture 22, the connecting tube 42 of a material feeding device 88 is connected to the connector 38 of the mold 66, while the connecting tube 84 of the pressurized-fluid supply device 82 is connected to the connector 78 of the mold 66. The material feeding device 88 is one type of the device 40 of FIG. 6 in which the motor 89 is used to rotate the feed screw for reciprocating the piston 50 of the feed cylinder 46. The motor 89 is controlled according to a drive signal received from a controller 92. The pressurized-fluid supply device 82 incorporates an air compressor which is controlled according to a drive signal received from the controller 92, so that the pressurized air as a pressurized fluid is fed into the rubber tubes 70, 72 through the connecting tube 84, connector 78 and fluid passage 76. To the connecting tube 42, there is connected a pressure sensor 94 for detecting an injection pressure PB of the material 44. To the connecting tube 84, there is connected a pressure sensor 96 for detecting the pressure PA of the compressed air in the rubber tubes 70, 72. Signals indicative of these pressures PB, PA are sent from the sensors 94, 96 to the controller 92. While the pressure detected by the pressure sensor 96 is the pressure within the connecting tube 84, this detected pressure can be used as the pressure PA within the rubber tubes 70, 72, since the pressure in the tubes 70, 72 is only slightly different from the pressure in the connecting tube 84. The pressure sensors 94, 96 may be thin-film type pressure sensors in which piezoelectric elements or strain gages are disposed on a thin film which deforms depending upon a pressure difference with respect to the atmospheric pressure. The pressurized-fluid supply device 82 may be adapted to pressurize a liquid or a gas other than the air. The material feeding device 88 using the motor 89 and feed screw to actuate the piston 50 of the feed cylinder 46 may be replaced by the material feeding device 112 shown in FIG. 25 in which the hydraulically or pneumatically operated cylinder 114 is used to move the piston 50 with a suitable back pressure.

The controller 92 includes a microcomputer incorporating a central processing unit (CPU), a random-access memory (RAM), a read-only memory (ROM), input and output interface circuits, A/D converters, and a timer circuit such as a crystal or quartz oscillator. The CPU operates to process signals to control the material feeding device 88, pressurized-fluid supply device 82 and a display 98, according to control programs stored in the ROM while utilizing a temporary data storage function of the RAM. There will be described an operation of the gasket fabricating system 90 under the control of the controller 92, by reference to the flow chart of FIGS. 14 and 15.

Figure 14:
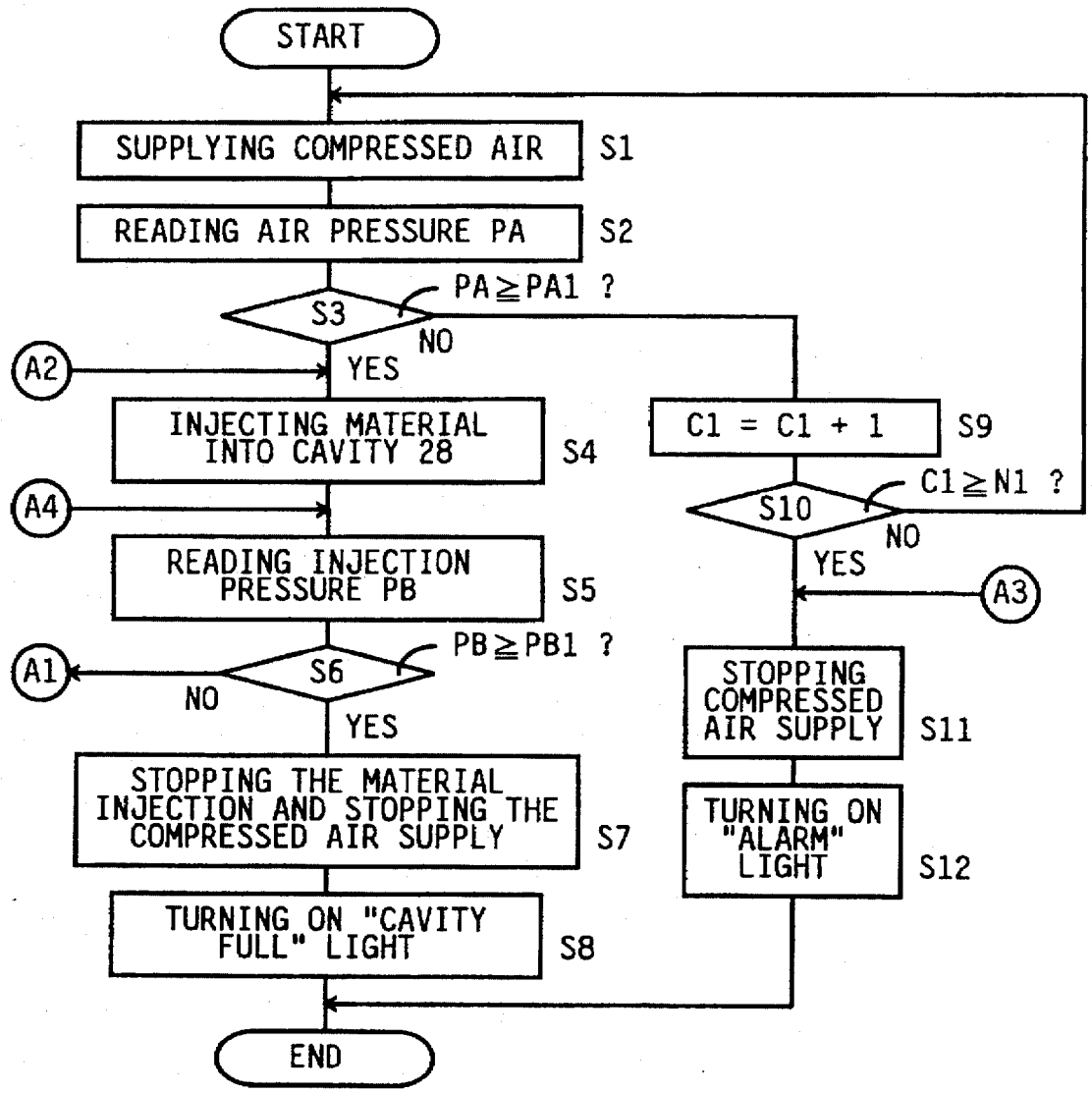
FIGS. 14 and 15 are flow charts illustrating an operation of the gasket fabricating system of FIG. 13 in injecting a material into the mold.
Figure 15:
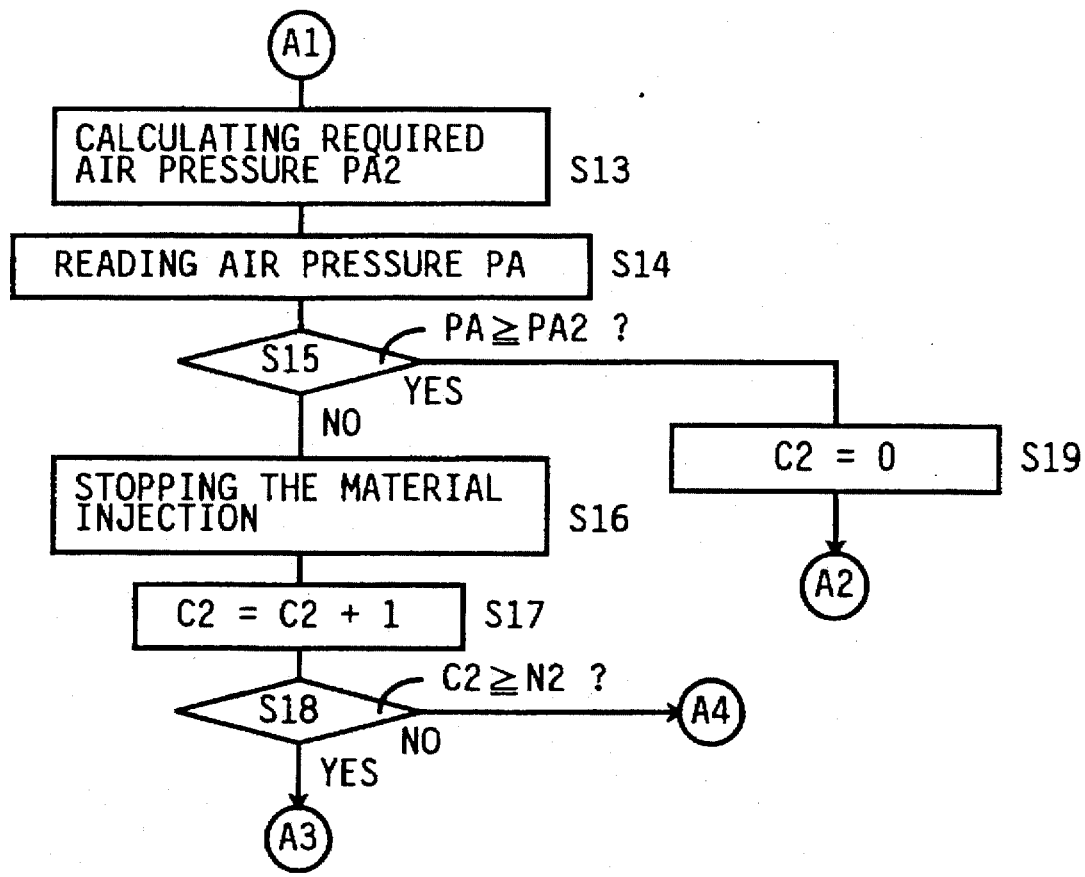

When a start switch is turned on, the controller 92 starts executing a control routine illustrated in FIGS. 14 and 15. The routine is initiated with step S1 to activate the pressurized-fluid supply device 82 to feed the compressed air to the rubber tubes 70, 72 at a predetermined delivery rate. Step S1 is followed by step S2 to read the air pressure PA represented by the signal from the pressure sensor 96. Then, the control flow goes to step S3 to determine whether the air pressure PA is equal to or higher than a predetermined initial level PA1. This initial level PA1 is determined by experiment or simulation or by calculation, on the basis of the actual air pressure in the rubber tubes 70, 72 when these tubes 70, 72 are normal, such that the initial level PA1 permits the rubber tubes 70, 72 to be expanded to an extent for sufficient pressure-tight contact with the joining surface 14 so as to prevent leakage of the material 44 injected. When the detected air pressure PA has been raised to the initial level PA1, the control flow goes to step S4. While the air pressure PA is lower than the initial level PA1, step S3 is followed by step S9 to increment a counter C1, and step S10 to determine whether the content of the counter C1 has reached a predetermined number N1.

The counter C1 is initialized or reset to "0" immediately after the routine is started, and incremented each time step S9 is implemented. Steps S9 and S10 cooperate to detect an abnormally slow increase in the air pressure PA due to some trouble such as a damage of the rubber tubes 70, 72, a defect in the pressurized-fluid supply device 82, and defective connection of the connecting tube 84 and connector 78. The predetermined number N1 is determined by first determining an optimum number to be counted by the counter C1 during a time period required for the pressure PA to be raised to the initial level PA1. The optimum number is determined by experiment or simulation or by calculation on the basis of the delivery rate of the compressed air and the cycle time necessary to repeat steps S1–S3, S9 and S10 while the tubes 70, 72, device 82, connecting tube 84 and connector 78 are normal. The number N1 is determined to be larger than the thus determined optimum number by a suitable value that accommodates a possible variation. If a negative decision (NO) is obtained in step S10, the control flow goes back to step S1. If an affirmative decision (YES) is obtained in step S10, the control goes to step S11 to turn off the pressurized-fluid supply device 82, and to step S12 to turn on an ALARM light on the display 98, for indicating the operator of the system 90 of the presence of some abnormality associated with the supply of the compressed air into the rubber tubes 70, 72.

If an affirmative decision (YES) is obtained in step S3 with the detected air pressure PA reaching the predetermined initial level before the content of the counter C1 reaching the predetermined number N1, the control flow goes to step S4 in which the motor 89 of the material feeding device 88 is turned on to start feeding the material 44. The motor 89 may be operated at a predetermined constant speed, or at a speed which varies with time according to a predetermined pattern so that the injection pressure PB of the material 44 increases with an increase in the compressed air pressure PA. Alternatively, the motor 89 may be operated with a suitable torque. The pressurized-fluid supply device 82 is kept operated to raise the air pressure PA in the rubber tubes 70, 72 even after the affirmative decision (YES) is obtained in step S3, namely, even after the injection of the material 44 is started in step S4. Step S4 is followed by step S5 to read the injection pressure PB of the material 44 represented by the signal received from the pressure sensor 94. Then, the control flow goes to step s6 to determine whether the detected injection pressure PB has reached a predetermined final level PB1. The injection pressure PB is initially comparatively low, and increases as the feeding resistance of the material 44 increases with an increase in the amount of injection of the material 44. The pressure PB suddenly rises when the cavity 28 is filled with the injected material 44. The final level PB1 is the pressure at which the cavity 28 is filled with the material 44. The final level PB1 is determined by experiment or simulation or by calculation. When the injection pressure PB has reached the final level PB1, step S7 is implemented to turn off the material feeding device 88 to stop the injection of the material 44, and turn off the pressurized-fluid supply device 82 to stop the supply of the compressed air. Step S7 is followed by step S8 to turn on a CAVITY FULL light on the display 98, to inform the operator of the completion of injection of the material 44 into the cavity 28.

Figure 16:
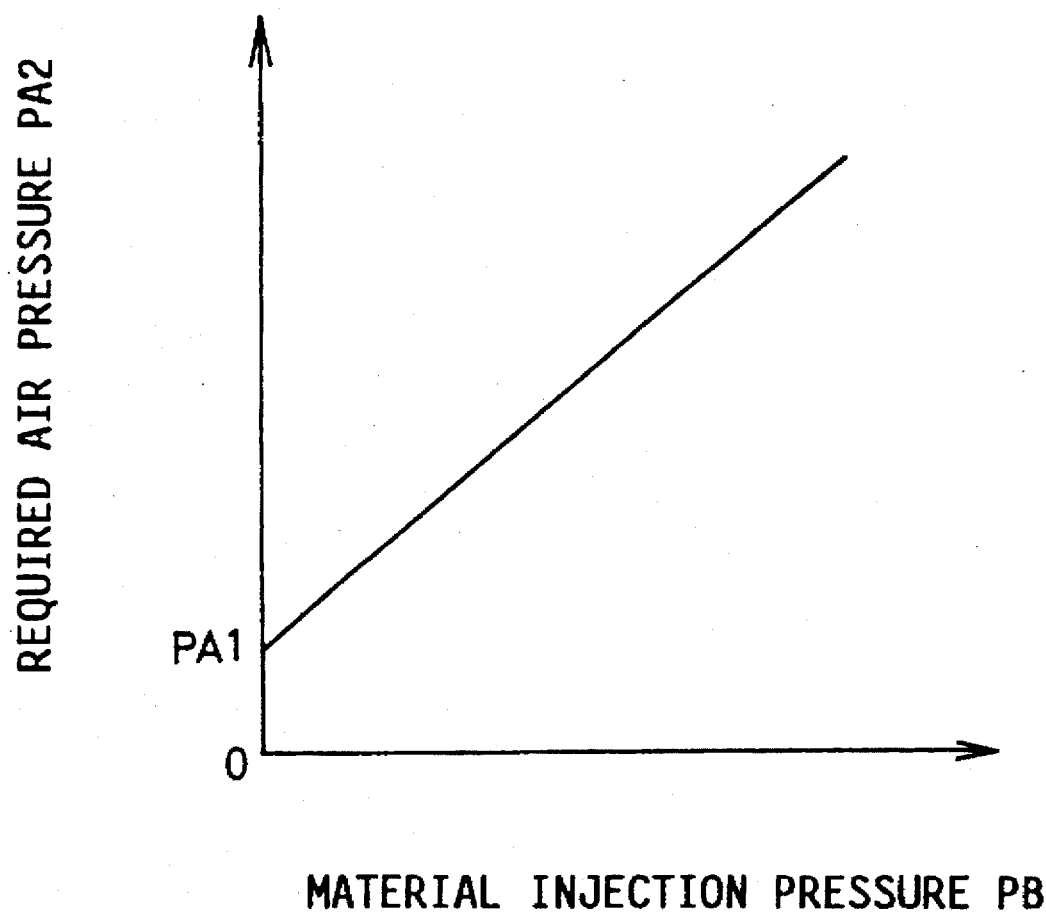
FIG. 16 is a graph indicating an example of a data map used in step S13 of FIG. 15 to calculate required air pressure PA2.

If a negative decision (NO) is obtained in step S6, that is, if the detected pressure PB is lower than the final level PB1, the control flow goes to step S13 (FIG. 15) to calculate a required air pressure level PA2, on the basis of the injection pressure PB detected in step S5, and according to a stored data map or equation representative of a predetermined relationship between PB and PA2 as illustrated in FIG. 16 by way of example. As the injection pressure PB is raised with an increase in the amount of the injected material 44, the gap or distance between the mold 66 and the head cover 10 is increased, whereby the ease of leakage of the material 44 tends to increase. However, the leakage is prevented by an increase in the compressed air pressure PA to the required level PA2. As is apparent from the graph of FIG. 16, the required level PA2 is determined by experiment or simulation, so as to increase with the injection pressure PB detected in step S5. Step S13 is followed by step S14 to read the compressed air pressure PA again, and by step S15 to determine whether the detected compressed air pressure PA has reached the required level PA2 calculated in step S13. If an affirmative decision (YES) is obtained in step S15, step S19 is implemented to reset a counter C2 to "0", and the control goes back to step S4. Steps S4–S6 are repeatedly implemented until the affirmative decision (YES) is obtained in step S6. That is, the injection of the material 44 is continued until the injection pressure PB has reached the predetermined final level PB1.

Figure 25:
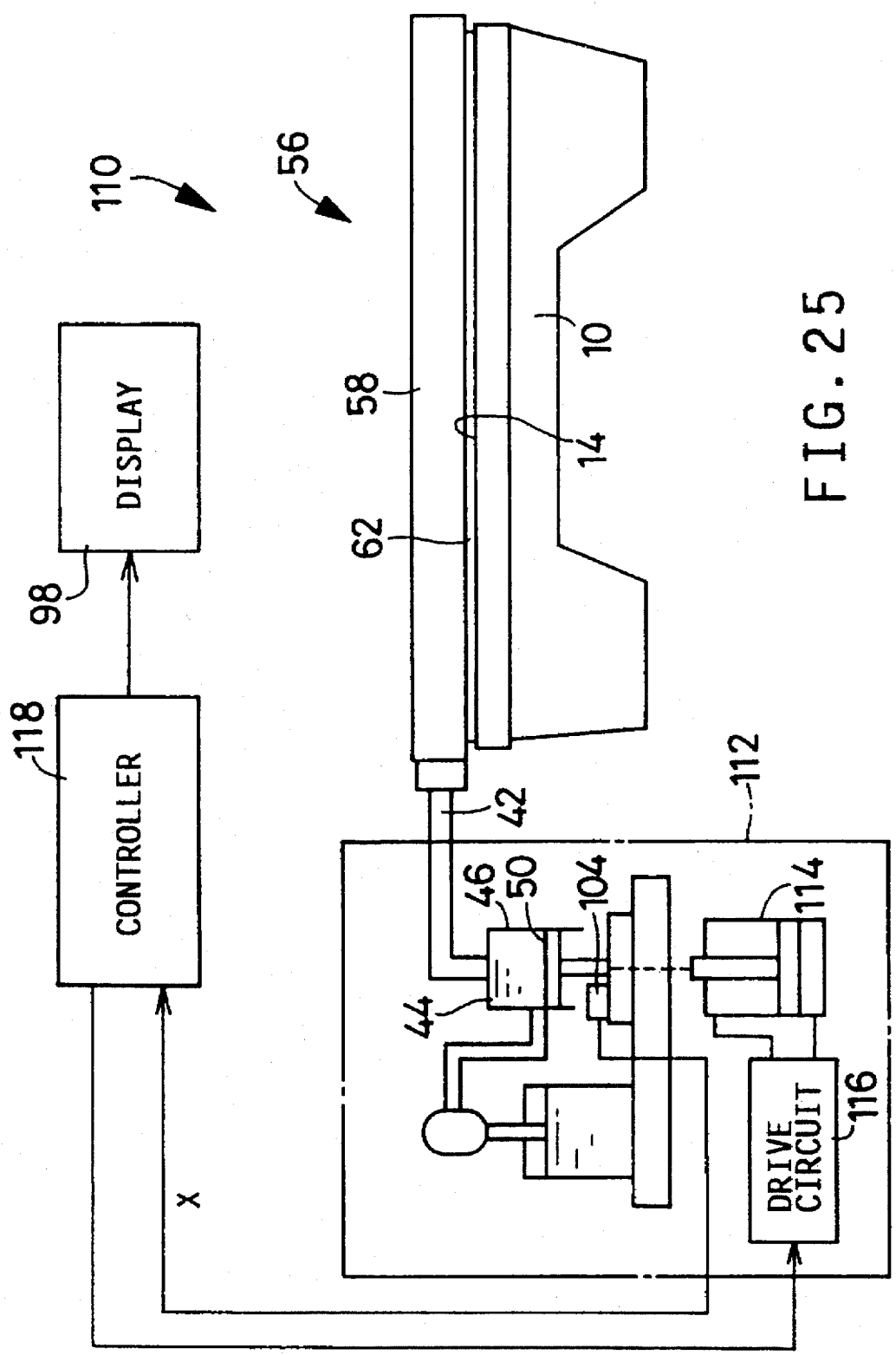
FIG. 25 is a schematic view showing a gasket fabricating system constructed according to still another embodiment of the invention.

If the detected air pressure PA is lower than the required level PA2, a negative decision (NO) is obtained in step S15. In this case, step S16 is implemented to turn off the material feeding device 88 to stop the injection of the material 44, that is, to turn off the motor 89 to stop the elevating movement of the piston 50. If the material feeding device 112 as shown in FIG. 25 is used, the drive cylinder 114 is stopped by cutting the pressurized fluid applied thereto. Then, the control flow goes to step S17 to increment the counter C2, and step S18 to determine whether the content of the counter C2 has reached a predetermined number N2.

The counter C2 is also reset to "0" immediately after the routine is initiated, or in step S19 described above. The content of the counter C2 represents a time lapse after the negative decision (NO) is obtained in step S15 for the first time, that is, a time length during which the compressed air pressure PA continues to be lower than the required level PA2. Steps S17 and S18 are provided to detect an abnormal rise of the compressed air pressure PA to the required level PA2, due to some trouble such as damage of the rubber tubes 70, 72, defect of the supply device 82 or poor connection of the tube 84 and connector 78. The predetermined number N2 may be a fixed number determined by the rate of rise of the air pressure PA while the supply device 82 and associated components are normal. Alternatively, the number N2 may be determined on the basis of the detected air pressure PA or injection pressure PB and according to a stored data map or equation representative of a predetermined N2-PA or N2-PB relationship. While the content of the counter C2 is smaller than the number N2, step S5 and the following steps are repeatedly implemented. If the detected air pressure PA has been raised to the required level PA2, that is, if the affirmative decision (YES) is obtained in step S15, the control goes to step S4 following step S19, whereby the material feeding device 88 is turned on again to resume the injection of the material 44. If the content of the counter C2 has reached the predetermined number N2, namely, if the predetermined time corresponding to the number N2 has passed without the air pressure PA reaching the required level PA2, the control flow goes to steps S11 and S12 to turn off the pressurized-fluid supply device 82 and turn on the ALARM light on the display 98.

When the cavity 28 is filled with the material 44 injected by the material feeding device 88 and the CAVITY FULL light is lit on the display 98, the mold 66 is disconnected from the material feeding device 88 and pressurized-fluid supply device 82, while the mold 66 is clamped to the head cover 10 by the fixture 22. Then, the head cover 10 and mold 66 are introduced into the curing device 52 illustrated in FIG. 1(c), so that the material 44 filling the cavity 28 is cured. Since the material 44 has a relatively high viscosity value, the material 44 introduced into the cavity 28 will not be discharged through the injection passage 34 when the connecting tube 42 is disconnected from the connector 38. On the other hand, the connector 78 is automatically closed when the connecting tube 84 of the supply device 82 is disconnected from the connector 78. Therefore, the compressed air will not leak from the rubber tubes 70, 72 through the fluid passage, and the air pressure PA will not drop. When the mold 66 is removed from the head cover 10 after the curing of the material 44, the connector 78 is connected to the air bleeder joint 86 as shown in FIG. 17, so that the compressed air is forced out of the rubber tubes 70, 72 by the elasticity of the tubes 70, 72. The joint 86 is then disconnected from the connector 78, and the mold 66 removed from the head cover 10 is coated with a mold releasing agent at its groove 26, and returned to the mold clamping station of FIG. 1(a) for use with the next workpiece (head cover 10).

In the present gasket fabricating system 90, the cavity 28 is pressure-tightly sealed by the rubber tubes 70, 72 which are elastically expanded by the compressed air introduced therein by the pressurized-fluid supply device 82 after the mold 66 is superposed on and clamped to the joining surface 14 of the workpiece in the form of the engine head cover 10. Further, the cavity 28 is filled with the material 44 by the material feeding device 88, and the material 44 is cured by the curing device into the gasket 12. Thus, the gasket 12 is simultaneously formed within the cavity 28 and fixedly attached to the fixing groove 16 formed in the head cover 10. Thus, the present system 90 has substantially the same advantage as the gasket fabricating process illustrated in FIGS. 1(a)–1(e) according to the first embodiment of the invention. Further, the rubber tubes 70, 72 elastically compressed against the joining surface 14 of the head cover 10 assure pressure tightness of the cavity 28 over the entire periphery of the cavity 28, without an excessive clamping force between the mold 56 and head cover 10, even if the joining surface 14 has some strain, deflection or buckling, or poor surface smoothness. Accordingly, the rubber tubes 70, 72 increases the yield ratio of the material 44 and provide substantially the same advantages as the elastic sealing members 60, 62 used with the mold 56 of FIG. 9.

In the present fourth embodiment of FIG. 13, the injection of the material 44 is initiated only after the compressed air pressure PA in the rubber tubes 70, 72 has been raised to the initial level PA1 high enough to assure pressure-tight contact of the rubber tubes 70, 72 with the joining surface 14 and prevent leakage of the material 44. Further, the material supply device 88 once turned on is turned off to interrupt the injection of the material 44 if the air pressure PA is lower than the required level PA2 which is determined depending upon the injection pressure PB so as to prevent leakage of the material. Thus, the material 44 is injected while the air pressure PA is held higher than the required level PA2, so that the material 44 is prevented from leaking even when the injection pressure PB is considerably high during a terminal portion of the material injection period. Since the injection of the material 44 is started only after the air pressure PA is raised to the relatively low initial level PA1, the nonproductive time is made shorter than in the case where the injection of the material 44 is started after the air pressure PA is raised to a comparatively high level corresponding to the injection pressure PB in a latter half of the injection period. In this respect, the time required to form the gasket 12 on the head cover 10 is significantly shortened.

It will be understood from the foregoing description that a portion of the controller 92 assigned to implement steps S13–S16 (FIG. 15) constitutes means for controlling an operation to inject the material 44 while preventing leakage of the material 44. In the illustrated embodiment, the material feeding device 88 is temporarily held off while the air pressure PA is lower than the required level PA2. However, the delivery rate of the air compressor of the pressurized-fluid supply device 82 and/or the operating speed or torque of the motor 89 of the material feeding device 88 may be suitably adjusted so that the injection pressure PB of the material 44 and the air pressure PA will rise while maintaining or satisfying a suitable relationship that assures injection of the material 44 without leakage. Where the material feeding device 112 of FIG. 25 is used in place of the material feeding device 88, the pressure of the pressurized fluid applied to the drive cylinder 114 may be adjusted to adjust the back pressure of the piston 50, rather than temporarily stopping the injection of the material 44. Further, the pressurized-fluid supply device 82 and the material feeding device 88 may be controlled to maintain the detected injection pressure PB below an upper limit, which is determined on the basis of the detected air pressure PA and according to a stored data map representative of a predetermined relationship between the pressures PA and PB, so that the material 44 will not leak at the pressures PA, PB.

As described above, the present gasket fabricating system 90 is adapted such that the ALARM light is turned on without the material feeding device 88 being started if the actual air pressure PA is not raised to the initial level PA1 in a predetermined time after the pressurized supply device 82 is turned on, that is, before the count of the counter C1 reaches the predetermined number N1. Further, the material feeding device 88 is turned off and the ALARM light is turned on if a predetermined time has passed while the air pressure PA is held lower than the required level PA2 after the device 88 is turned on, that is, if the count of the counter C2 reaches the predetermined number N2 before the air pressure PA has reached the required level PA2. These arrangements permit early detection of any abnormality associated with the introduction of the compressed air into the rubber tubes 70, 72, such as damaging of the rubber tubes 70, 72, defects of the pressurized-fluid supply device 82 or abnormal connection of the connecting tube 84 and connector 78. Thus, the present system 90 is adapted to minimize the risk of leakage of the material 44, which would lead to reduced yield ratio of the material and defective gaskets 12 due to air in the mold cavity 28.

It will also be understood that a portion of the controller 92 assigned to implement steps S3, S9 and S10 (FIG. 14) and steps S15, S17 and S18 (FIG. 15) constitutes means for providing an indication of abnormality associated with the introduction of the compressed air into the rubber tubes 70, 72. The initial and required levels PA1, PA2 are the threshold values used to detect the abnormality. Although the abnormality detection is effected both before and after the injection of the material 44 is started (in step S4), the detection may be effected only before or after the start of the material injection. That is, only a series of steps S3, S9 and S10, or only a series of steps S15, S17 and S18 may be implemented.

Figure 18:
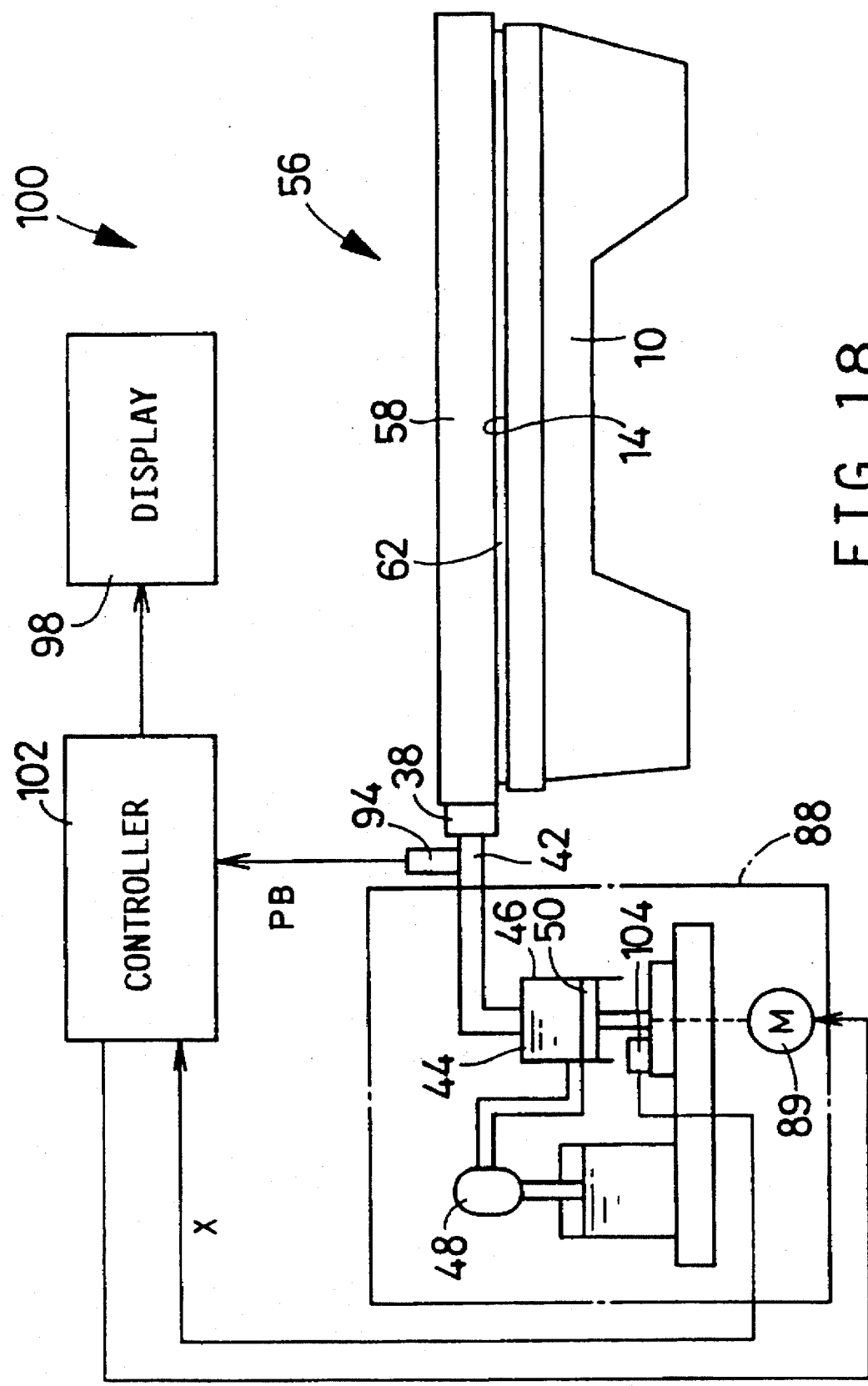
FIG. 18 is a gasket fabricating system constructed according to a yet further embodiment of this invention.

Referring to FIG. 18, there is shown a gasket fabricating system 100 constructed according to a fifth embodiment of the present invention, in which the connecting tube 42 of the material feeding device 88 is connected to the connector 38 of the mold 56 of FIG. 9 after the mold 56 is clamped to the head cover 10 by the fixture 22. The motor 89 of the material feeding device 88 is controlled by a controller 102. The connecting tube 42 of the device 88 is provided with the pressure sensor 94 for detecting the injection pressure PB of the material 44, and the signal indicative of the pressure PB is fed to the controller 102. The device 88 also has a position sensor 104 for detecting a position X of the piston 50 of the feed cylinder 46, and the signal indicative of the position X is also fed to the controller 102. The position sensor 104 may be an optical one or a magnetic linear encoder, or may be a rotary encoder adapted to detect the number of rotation of the motor 89, which is used by the controller 102 to calculate the position X of the piston 50. While the present embodiment uses the mold 56 having the elastic sealing members 60, 62, the mold 56 may be replaced by the mold 20 or the mold 66. Similarly, the material feeding device 88 using the motor 89 and feed screw to reciprocate the piston 50 may be replaced by the material feeding device 112 of FIG. 25 which uses the drive cylinder 114 to move the piston 50 with a suitable back pressure.

Figure 19:
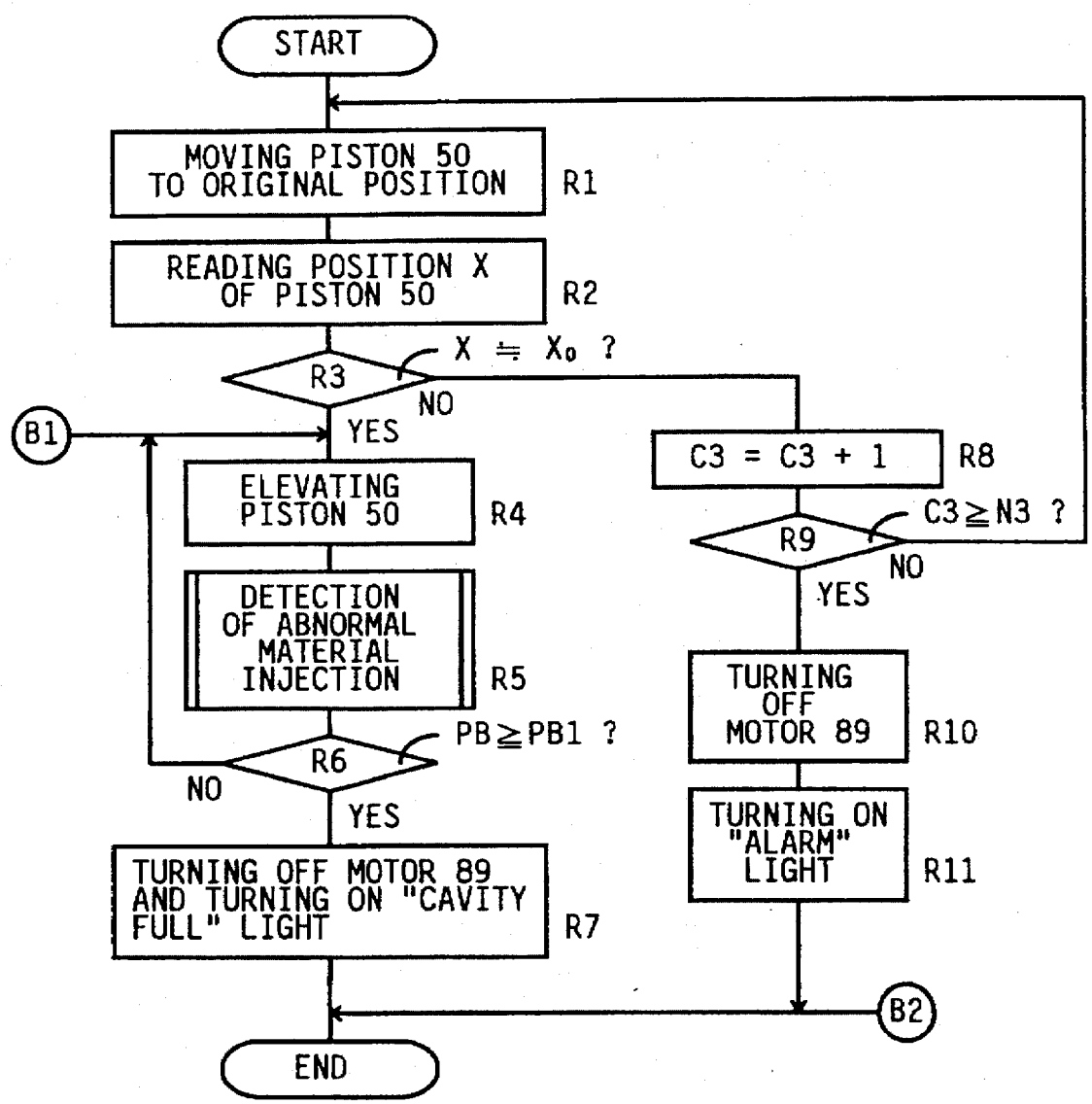
FIG. 19 is a flow chart illustrating one form of operation of the gasket fabricating system of FIG. 18.
Figure 20:
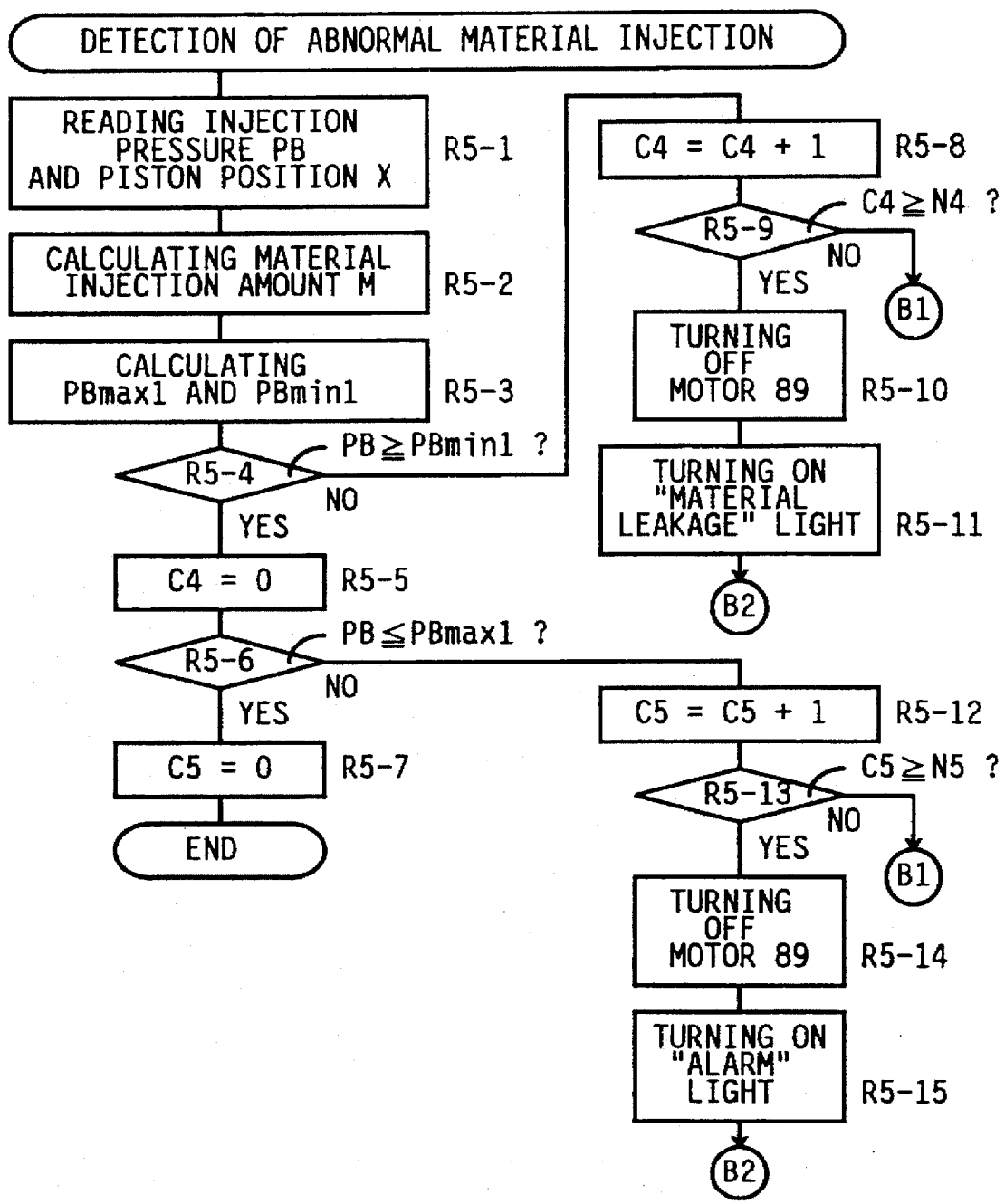
FIG. 20 is a flow chart showing details of step R5 in the flow chart of FIG. 19.
Figure 22:
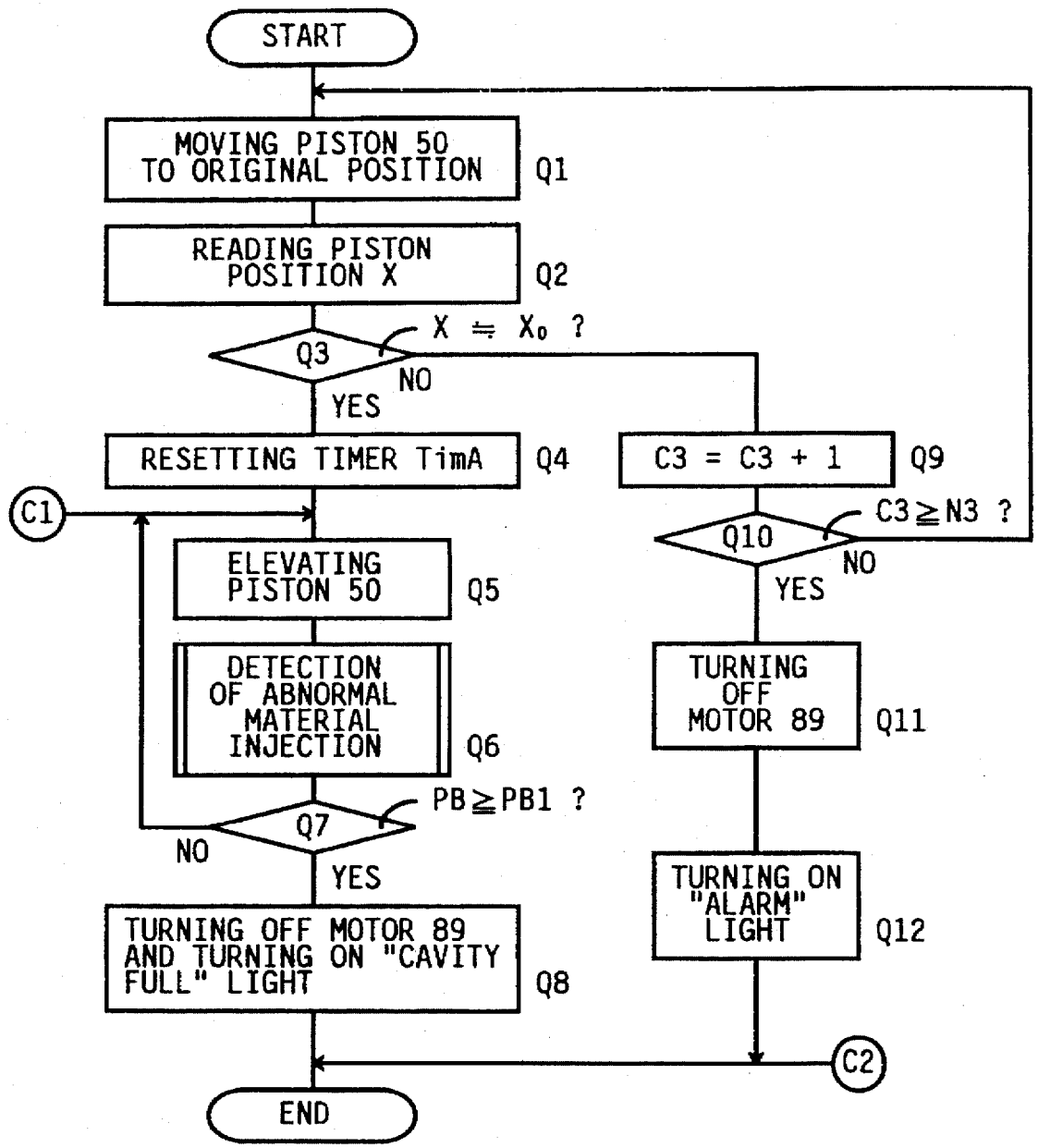
FIG. 22 is a flow chart illustrating another form of operation of the gasket fabricating system of FIG. 18.
Figure 23:
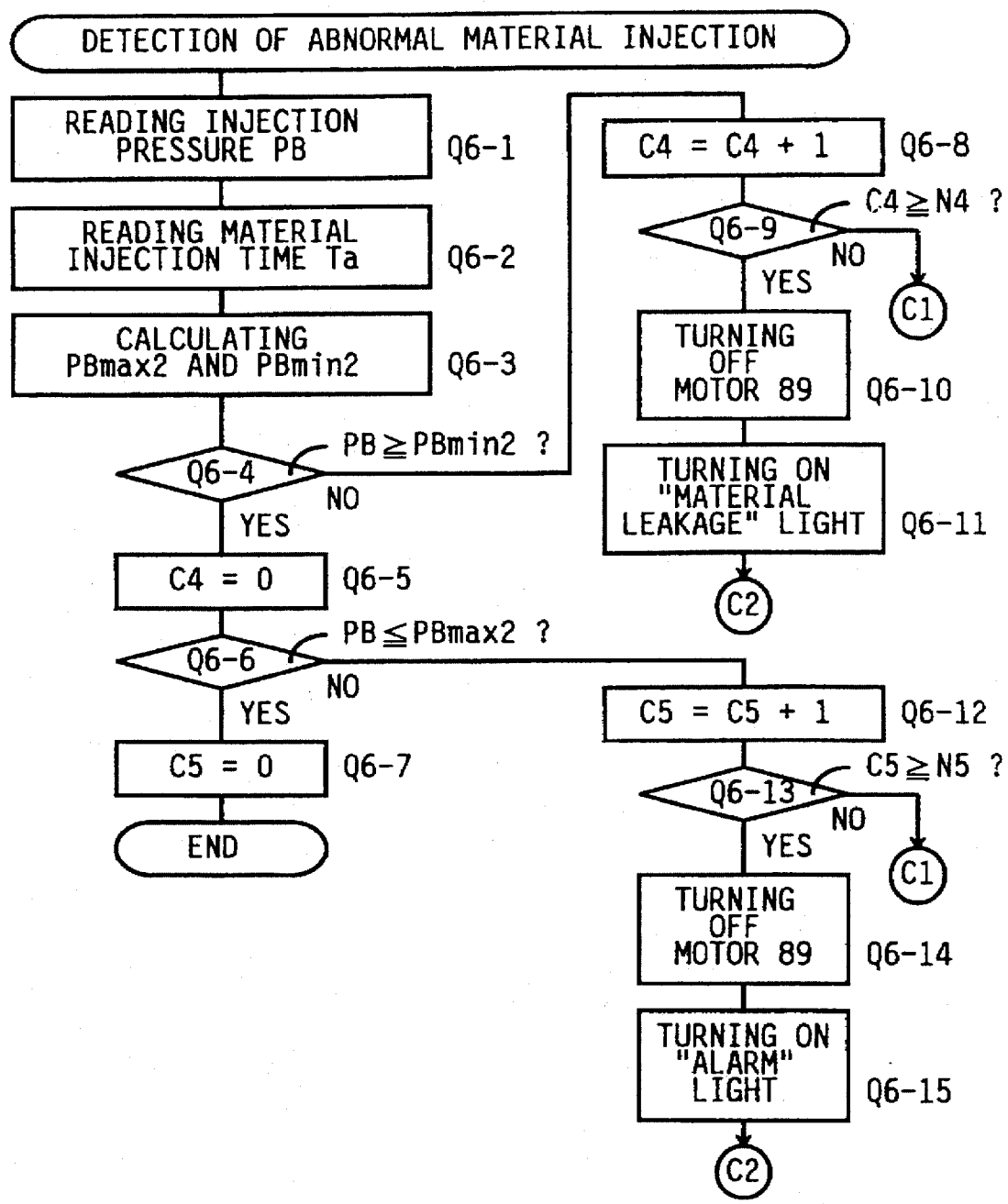
FIG. 23 is a flow chart showing details of step Q6 in the flow chart of FIG. 22.

Like the controller 92, the controller 102 includes a microcomputer, which is adapted to execute a routine as illustrated in the flow chart of FIGS. 19 and 20 or in the flow chart of FIGS. 22 and 23. The routine of FIGS. 19 and 20 is initiated with step R1 when a start switch is turned on. In step R1, the motor 89 is rotated in the reverse direction to return the piston 50 to its original position $X_0$ at which the injection of the material 44 is started. Step R1 is followed by step R2 to read the position X represented by the signal received from the position sensor 104. Then, the control flow goes to step R3 to determine whether the detected position X is almost aligned with the original position $X_0$. When the piston 50 is returned to the original position $X_0$, step R4 is implemented. If the piston 50 has not been returned to the original position $X_0$, step R3 is followed by step R8 in which a counter C3 is incremented, and by step R9 to determine whether the content of the counter C3 has reached a predetermined number N3.

The counter C3 is reset to "0" when the routine is started, and is incremented each time step R8 is implemented after the piston 50 has started its return movement to the original position $X_0$. Steps R8 and R9 are provided to detect an abnormally slow movement of the piston 50 to its original position $X_0$ for some reasons such as excessive adhesion of the material 44 to the feed cylinder 46 or sticking of the piston 50. The predetermined number N3 is determined by first determining an optimum number to be counted by the counter C3 during a time period required for the piston 50 to return to its original position $X_0$. The optimum number is determined by experiment or simulation or by calculation on the basis of the moving speed of the piston 50 (i.e., rotating speed of the motor 89) and the cycle time necessary to repeat steps R1–R3, R8 and R9 while the material feeding device 88 is normal. The number N3 is determined to be larger than the thus determined optimum number by a suitable value that accommodates a possible variation. If a negative decision (NO) is obtained in step R9, the control flow goes back to step R1 to repeat the steps R1–R3, R8 and R9 with the predetermined cycle time. If an affirmative decision (YES) is obtained in step R9, the control flow goes to step R10 to turn off the motor 89, and step R11 to turn on the ALARM light on the display 98.

If an affirmative decision (YES) is obtained in step R3 with the piston 50 returned to the original position $X_0$ before the count of the counter C3 reaches the predetermined number N3, the control flow goes to step R4 in which the motor 89 of the device 88 is once turned off and then turned on to rotate in the forward direction for elevating the piston 50 to start feeding the material 44. For example, the motor 89 is operated at a predetermined constant speed. However, the operating speed of the motor 89 may be suitably changed during injection of the material 44, or the motor 89 may be operated with a predetermined torque. Step R4 is followed by step R5, which is a sub-routine as illustrated in the flow chart of FIG. 20, for detecting abnormal injection of the material 44.

The sub-routine of FIG. 20 is initiated with step R5-1 to read the injection pressure PB represented by the signal from the pressure sensor 94, and the position X of the piston 50 on the basis of the signal received from the position sensor 104. Step R5-1 is followed by step R5-2 to calculate an amount M of the injected material 44 on the basis of the detected position X. The injection amount M is calculated by multiplying a distance $(X-X_0)$ of the presently detected position X from the original position $X_0$, by the cross sectional area of the feed cylinder 46. Thus, the position sensor 104 for detecting the position X serves as a sensor for detecting the injection amount M of the material 44. Where the position X is obtained from the number of rotation of the motor 89, a rotary encoder for detecting the number of rotation of the motor 89 serves as a sensor for detecting the injection amount M.

Figure 21:
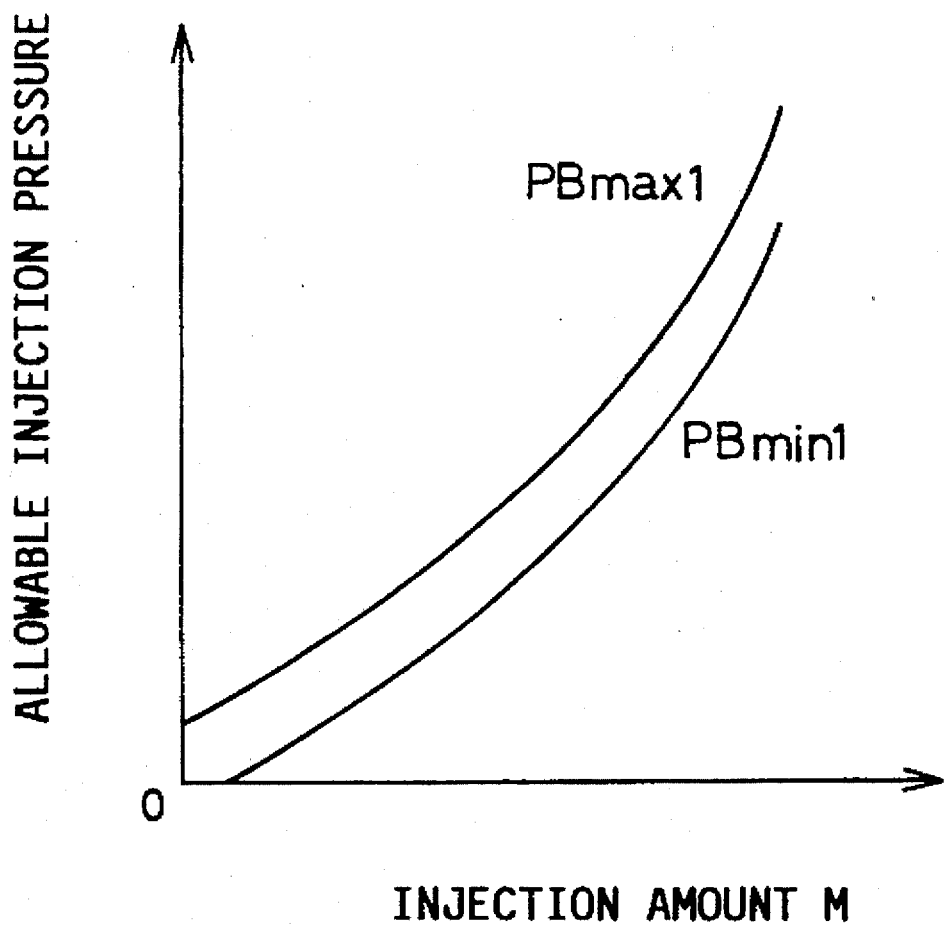
FIG. 21 is a graph indicating an example of a data map used in step R5-3 of FIG. 20 to calculate maximum and minimum allowable material injection pressure levels PBmax1 and PBmin1.

Then, the control flow goes to step R5-3 to calculate a maximum allowable injection pressure PBmax1 and a minimum allowable injection pressure PBmin1 on the basis of the calculated injection amount M, and according to stored maps or equations representative of predetermined relationships between the values PBmax1 and PBmin1 and the injection amount M, as indicated in the graph of FIG. 21 by way of example. The maximum and minimum allowable injection pressures PBmax1 and PBmin1 define an optimum range of the injection pressure PB of the material 44, which is used to determine whether the material 44 is normally injected into the mold 56. The data maps or equations are determined by experiment or simulation on the basis of the injecting condition of the material 44 when the system 100 is normal. Described in detail, the injection pressure PB increases with an increase in the injecting resistance as the injection amount M increases. If there existed a leakage flow of the material 44 due to cracking or other damage of the elastic sealing members 60, 62 of the mold 56 or due to defective connection of the connecting tube 42 and connector 38, the injection pressure PB would be lower than the optimum level. If the injection passage 34 was partly closed or plugged with a foreign matter, the injection pressure PB would be higher than the optimum level. Therefore, the optimum or allowable range (PBmax1–PBmin1) of the injection pressure may be determined as a function of the actual injection amount M. The optimum range (PBmax1–PBmin1) accommodates a fluctuation associated with the material injection due to a variation of the viscosity of the material 44 and a variation of the characteristics of the specific mold 56 with respect to the nominal specifications.

Step R5-3 is followed by step R5-4 to determine whether the detected injection pressure PB has been raised to the calculated minimum allowable pressure PBmin1. If an affirmative decision (YES) is obtained in step R5-4, the control flow goes to step R5-5. If a negative decision (NO) is obtained in step R5-4, step R5-8 is implemented to increment a counter C4. Step R5-8 is followed by step R5-9 to determine whether the content of the counter C4 has reached a predetermined number N4. The counter C4 is reset to "0" immediately after the routine is initiated, and counts the number of implementation of step R5-8 after the negative decision (NO) is obtained in step R5-4 for the first time. Steps R5-8 and R5-9 are provided to determine whether the pressure PB is temporarily lower than the minimum allowable level PBmin1 due to some fluctuating factors associated with the injection of the material 44, or whether the pressure PB lower than the level PBmin1 is of a permanent nature due to leakage of the material 44. The number N4 is determined on the basis of expected fluctuating factors during normal operation of the system 100. While the content of the counter C4 is smaller than the predetermined number N4, the control returns to step R4 (FIG. 19), and the injection of the material 44 is continued. If the content of the counter C4 has reached the number N4, the control flow goes to step R5-10 to turn off the motor 89 to stop the injection of the material 44, and step R5-11 to turn on an MATERIAL LEAKAGE light on the display 98, informing the operator of the leakage of the material 44.

If an affirmative decision (YES) is obtained in step R5-4 with the injection pressure PB raised to the minimum allowable level PBmin1, step R5-5 is implemented to reset the counter C4 to "0". Then, step R5-6 is implemented to determine whether the actual injection pressure PB is equal to or lower than the maximum allowable limit PBmax1. If an affirmative decision (YES) is obtained in step R5-6, the control flow goes to step R5-7. If a negative decision (NO) is obtained in step R5-6, the control flow goes to step R5-12 to increment a counter C5, and step R5-13 to determine whether the content of the counter C5 has reached a predetermined number N5. The counter C5 is reset to "0" immediately after the start of the routine or in step R5-7, and counts the number of implementation of step R5-13 after the negative decision (NO) is obtained for the first time in step R5-6, that is, while the injection pressure PB higher than the maximum allowable level PBmax1. Steps R5-12 and R5-13 are provided to determine whether the pressure PB is temporarily higher than the maximum allowable level PBmax1 due to some fluctuating factors associated with the injection of the material 44, or whether the pressure PB higher than the level PBmax1 is of a permanent nature due to plugging of the connecting tube 42 or the injection passage 34 with a foreign matter, for example. The number N5 is determined on the basis of expected fluctuating factors during normal operation of the system 100. While the content of the counter C5 is smaller than the predetermined number N5, the control returns to step R4 (FIG. 19), and the injection of the material 44 is continued. If the content of the counter C5 has reached the number N5, the control flow goes to step R5-14 to turn off the motor 89 to stop the injection of the material 44, and step R5-15 to turn on the ALARM light on the display 98, informing the operator that the pressure PB is abnormally high.

If an affirmative decision (YES) is obtained in step R5-6, that is, if the detected injection pressure PB is held within the allowable or optimum range between PBmin1 and PBmax1, step R5-7 is implemented to reset the counter C5 to "0", and one cycle of the sub-routine of step R5 (FIG. 19) is terminated. Then, the control flow goes to step R6 to determine whether the injection pressure PB has been raised to the predetermined final level PB1, as in step S6 in the routine of FIG. 14 used in the fourth embodiment. If a negative decision (NO) is obtained in step R6, the control returns to step R4. Steps R4–R6 are repeatedly implemented, that is, the injection of the material 44 is continued until the injection pressure PB is raised to the final level PB1. When the injection pressure PB has been raised to the final level PB1, step R7 is implemented to turn off the motor 89 to terminate the injection of the material 44 and turn on the CAVITY FULL light on the display 98.

After the cavity 28 is filled with the material 44 and the CAVITY FULL light is illuminated on the display 98 in the gasket fabricating system 100, the mold 56 is disconnected from the material feeding device 88 and is moved to the next curing station of FIG. 1(c), while the mold 56 is kept clamped to the head cover 10.

In the present gasket fabricating system 100, too, the gasket 12 is simultaneously formed on the head cover 10 and fixed in the gasket-fixing groove 16, by injecting the material 44 into the cavity 28 by the material feeding device 88 while the mold 56 is clamped to the joining surface 14 of the head cover 10. Thus, the present system 100 provides substantially the same advantage as described above with respect to the first embodiment.

Further, the present fifth embodiment is adapted such that the injection of the material 44 is interrupted with the motor 89 turned off if the actual injection pressure PB detected by the pressure sensor 94 is held lower than the predetermined minimum allowable level PBmin1 (determined by the calculated injection amount M) for more than a predetermined time, that is, if the count of the counter C4 has reached the predetermined number N4. In this event, the MATERIAL LEAKAGE light is turned on on the display 98. This arrangement enables the operator to detect, without a delay, the leakage of the material 44 due to some trouble such as damage of the elastic sealing members 60, 62 or defective connection of the material feeding device 88, thereby making it possible to prevent reduction of the yield ratio of the material 44 and defective gasket 12. Similarly, the motor 89 is turned off to interrupt the injection of the material 44 if the actual injection pressure PB is held higher than the predetermined maximum allowable level PBmax1 (determined by the injection amount M) for more than a predetermined time, that is, if the count of the counter C5 has reached the predetermined number N5. This arrangement permits early detection of abnormal flow of the material 44 through the injection passage 34 or the connecting tube 42 due to plugging of the passage with a foreign matter, for example, making it possible to prevent otherwise resulting defective gasket 12 or damaging of the material feeding device 88 due to an excessive rise of the injection pressure PB.

It will be understood that a portion of the controller 102 assigned to implement step R5 of the routine of FIG. 19 (i.e., sub-routine of FIG. 20) constitutes means for providing an indication of abnormal injection of the material 44, and that the data maps of FIG. 21 or corresponding equations used to calculate the maximum and minimum allowable pressure levels PBmax1 and PBmin1 represent predetermined relationships between the injection amount M and injection pressure PB of the material 44. Although the gasket fabricating system 100 is adapted to continuously monitor the injection pressure PB of the material 44, it is possible to monitor the injection pressure PB at selected value or values of the injection amount M, for example. Further, it is possible to determine whether the detected injection amount M is held within an allowable range between the maximum and minimum allowable values which are determined by the detected injection pressure PB. The monitoring of the injection pressure PB may be made using only one of the maximum and minimum allowable levels PBmax1 and PBmin1.

In the present embodiment, the motor 89 is turned off and the ALARM light is illuminated on the display 98 if the piston 50 has not been returned to the original position $X_0$ in a predetermined time, namely, before the count of the counter C3 has reached the predetermined number N3. This arrangement permits early detection of abnormality associated with the feed cylinder 46 such as excessive adhesion of the material 44 to the cylinder 46 or sticking of the piston 50.

Referring to the flow chart of FIGS. 22 and 23, there is illustrated a modified routine for controlling the injection of the material 44 in the gasket fabricating system 100 of FIG. 18, according to a sixth embodiment of this invention. Steps Q1–Q3 and Q7–Q12 are identical with steps R1–R3 and R6–R11 of FIG. 19, and detailed or redundant description of these steps will not be provided. In the routine of FIG. 22, step Q4 is implemented if an affirmative decision (YES) is obtained in step Q3, to reset a timer TimA for starting a time measurement using a timer circuit incorporating a crystal or quartz oscillator, for example. Then, step Q5 is implemented to turn on the motor 89 for elevating the piston 50 to start the injection of the material 44. Thus, the timer TimA serves as means for measuring a material injection time Ta, namely, the time after the injection of the material 44 by the material feeding device 88 is started. The timer TimA may be replaced by a counter which counts the number of repeated implementation of a series of steps at a constant cycle time. In step Q5, the motor 89 is controlled to operate at a predetermined constant speed to elevate the piston 50 at a constant speed. However, the speed of the motor 89 may be changed in a predetermined pattern as a function of time. Where the material feeding device 112 of FIG. 25 is used, the piston 50 may be moved with a constant back pressure, or the back pressure may be changed in a given pattern as a function of time. Step Q5 is followed by step Q6 to execute a sub-routine of FIG. 23 for detecting abnormality associated with the injection of the material 44.

Figure 24:
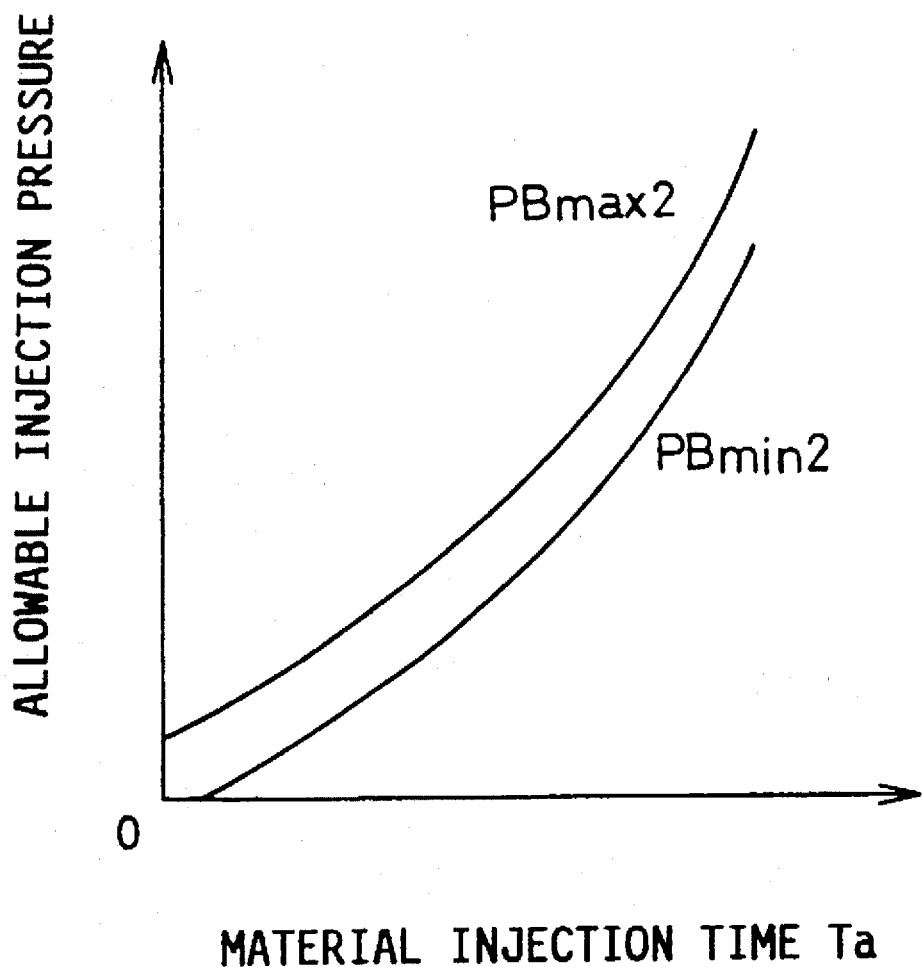
FIG. 24 is a graph indicating an example of a data map used in step Q6-3 of FIG. 23 to calculate the maximum and minimum allowable material injection pressure levels PBmax2 and PBmin2.

The sub-routine of FIG. 23 is initiated with step Q6-1 to read the injection pressure represented by the signal received from the pressure sensor 94. Step Q6-1 is followed by step Q6-2 to read the material injection time Ta represented by the timer TimA. Then, step Q6-3 is implemented to calculate maximum and minimum allowable injection pressure levels PBmax2 and PBmin2, on the basis of the material injection time Ta, and according to stored data maps or equations representative of predetermined relationships between the time Ta and the pressure levels PBmax2 and PBmin2 as indicated in the graph of FIG. 24 by way of example. These pressure levels PBmax2 and PBmin2 are used as thresholds for monitoring the injection of the material 44. The data maps or equations to calculate these thresholds are determined by experiment or simulation on the basis of the injecting condition of the material 44 while the system 100 is normal. The injection pressure PB increases with an increase in the injecting resistance of the material 44, which increases with an increase in the injection amount as a function of the injection time Ta. If there existed a leakage flow of the material 44 due to cracking or other damage of the elastic sealing members 60, 62 of the mold 56 or due to defective connection of the connecting tube 42 and connector 38, the injection pressure PB would be lower than the optimum level. If the injection passage 34 was partly closed or plugged with a foreign matter, the injection pressure PB would be higher than the optimum level. Therefore, the optimum or allowable range (PBmax2–PBmin2) of the injection pressure may be determined as a function of the material injection time Ta. The optimum range (PBmax2–PBmin2) accommodates a fluctuation associated with the material injection due to a variation of the viscosity of the material 44 and a variation of the characteristics of the specific mold 56 with respect to the nominal specifications.

Step Q6-3 is followed by step Q6-4 to determine whether the detected injection pressure PB has been raised to the calculated minimum allowable level PBmin2. If the injection pressure PB is held lower than the minimum allowable level PBmin2 for more than a predetermined time, the motor 89 is turned off in step Q6-10, and the MATERIAL LEAKAGE light on the display 98 is turned on in step Q6-11. Step Q6-6 is provided to determine whether the injection pressure PB is equal to or lower than the maximum allowable level PBmax2. If the injection pressure PB is held higher than the maximum allowable level PBmax2 for more than a predetermined time, the motor 89 is turned off in step Q6-14, and the ALARM light on the display 98 is turned on in step Q6-15. It is noted that steps Q6-5 and Q6-7 through Q6-15 in FIG. 23 are identical with steps R5-5 and R5-7 through R5-15 in FIG. 20, respectively.

The present sixth embodiment of FIGS. 22 and 23 also permits early detection of leakage of the material 44, plugging of the injection passage 34 or the connecting tube 42, defective connection of the material feeding device 88 to the mold 56, and other abnormality. Thus, the present embodiment provide substantially the same advantage as the fifth embodiment of FIGS. 19 and 20. Further, since the injection pressure PB is monitored in relation to the material injection time Ta, the position sensor 104 is not required for effecting the sub-routine of FIG. 23. It will be understood that a portion of the controller 102 assigned to implement step Q6 of FIG. 22, that is, the sub-routine of FIG. 23, constitutes means for providing an indication of abnormality associated with the injection of the material 44. The data maps or equations used to calculate the maximum and minimum allowable pressure levels PBmax2, PBmin2 represent predetermined relationships between the injection pressure PB and the material injection time Ta. While the present embodiment is also adapted to continuously monitor the injection pressure PB, it is possible to monitor the injection pressure PB at selected value or values of the material injection time Ta. It is also possible to determine whether the measured material injection time Ta is held within an allowable range between the maximum and minimum allowable values which are determined by the detected injection pressure PB. The monitoring of the injection pressure PB may be made using only one of the maximum and minimum allowable pressure levels PBmax2 and PBmin2.

The gasket fabricating system 110 shown in FIG. 25 constructed according to a seventh embodiment of the invention uses the material feeding device 112 indicated above, which is different from the material feeding device 88 used in the gasket fabricating system 100 of FIG. 18. The material feeding device 112 uses the drive cylinder 114 which is operated by a hydraulic or pneumatic pressure to actuate the piston 50 of the feed cylinder 46 with a predetermined back pressure. The device 112 incorporates a drive circuit 116 which includes a fluid pressurizing pump and a directional control valve. The drive circuit 116 is controlled according to a drive signal received from a controller 118, to control the drive cylinder 114 for reciprocating the piston 50. The controller 118 receives a signal from the position sensor 104 on the feed cylinder 46, which signal represents the position X of the piston 50. The present system 110 may also use the mold 20 or 66 in place of the mold 56, and/or the material feeding device 88 with the motor 89 in place of the device 112.

Figure 26:
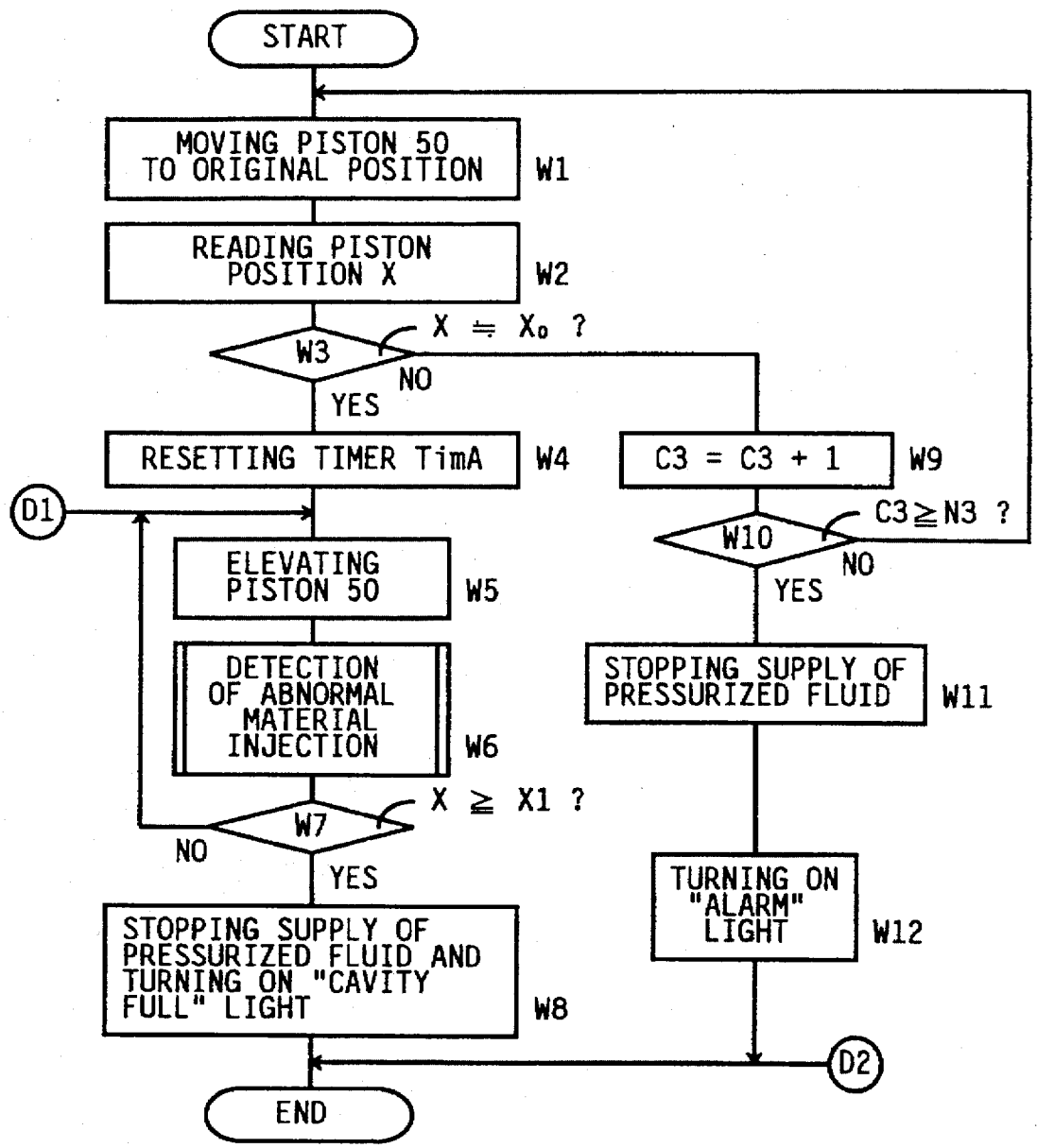
FIG. 26 is a flow chart illustrating an operation of the system of FIG. 25.
Figure 27:
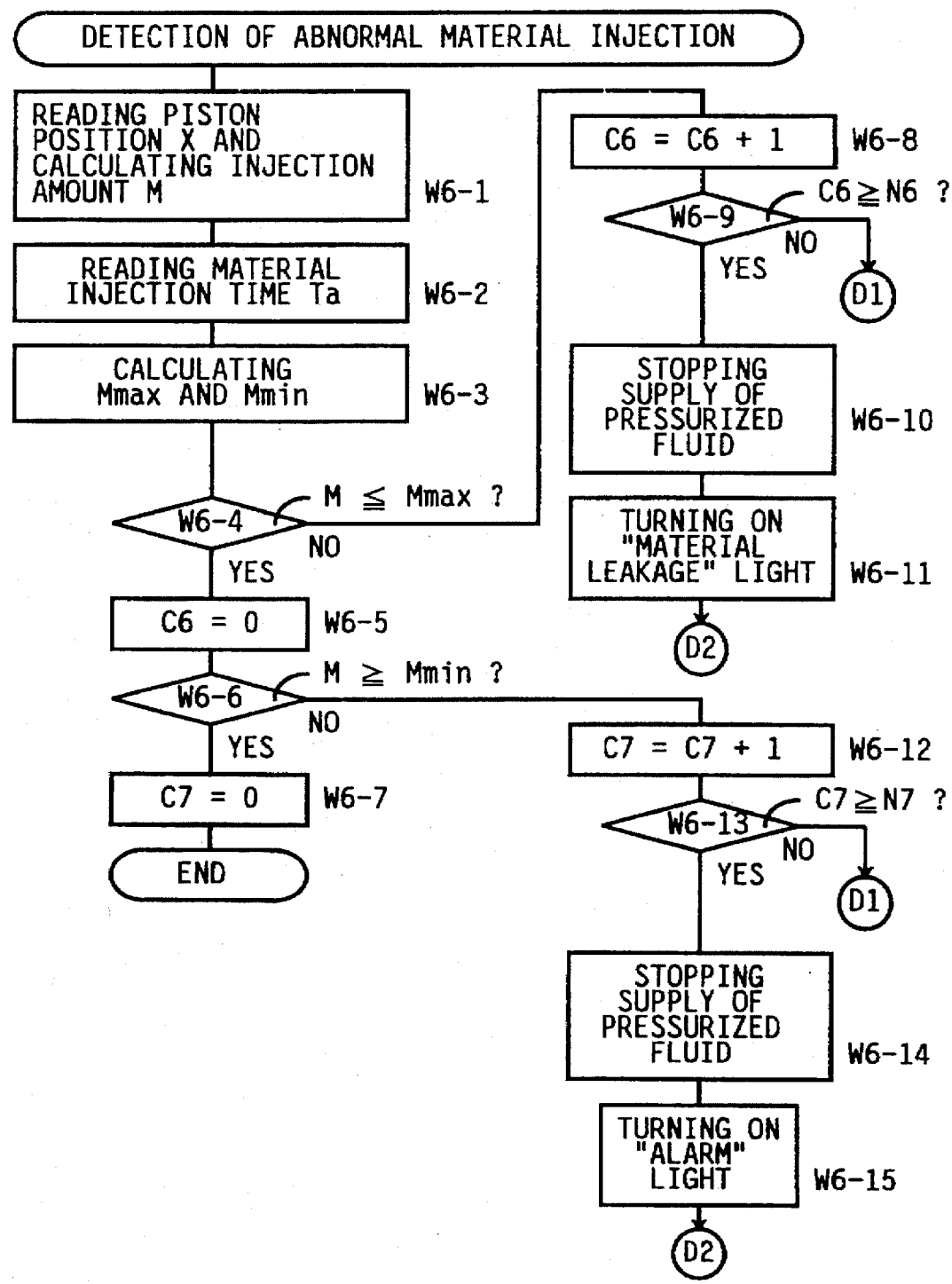
FIG. 27 is a flow chart showing details of step W6 in the flow chart of FIG. 26.

Like the controllers 92, 102, the controller 118 uses a microcomputer, which is adapted to execute a routine of FIGS. 26 and 27. The routine of FIG. 26 is substantially the same as the routine of FIG. 22, except for steps W6 and W7, and with an exception that the drive circuit 116 and drive cylinder 114 are used to return the piston 50 to the original position $X_0$ and elevate the piston 50 to inject the material 44, and that the supply of the pressurized fluid to the drive cylinder 114 is stopped to interrupt the injection of the material 44. Although the piston 50 is elevated in step W5 by a predetermined constant back pressure with a constant fluid pressure applied to the drive cylinder 114, the fluid pressure to be applied to the drive cylinder 114 may be changed according to a suitable pattern as a function of time to thereby change the back pressure of the piston 50 during injection of the material 44. Where the material injecting device 88 is used, the torque of the motor 89 may be held constant, or may be controlled to change according to a predetermined pattern as a function of time.

Figure 28:
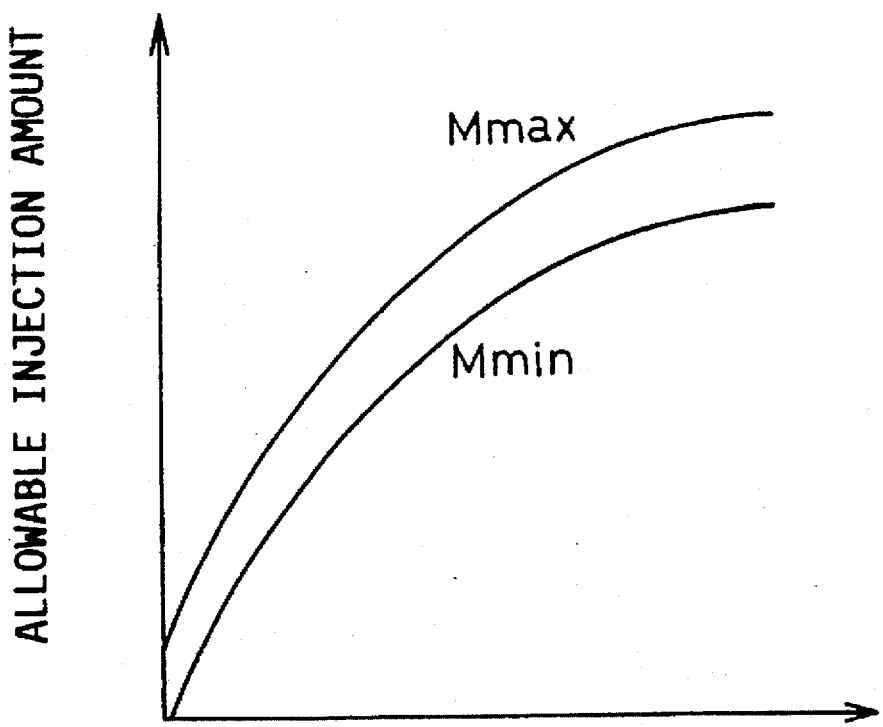
FIG. 28 is a graph indicating an example of a data map used in step W6-3 of FIG. 27 to calculate maximum and minimum allowable material injection amounts Mmax and Mmin.

Step W6 in FIG. 26 is a sub-routine for detecting abnormality associated with the injection of the material 44, as illustrated in the flow chart of FIG. 27. This sub-routine is initiated with step W6-1 to read the position X of the piston 50 represented by the signal received from the position sensor 104, and calculate the injection amount M of the material 44 on the basis of the position. X, as in step R5-2 in FIG. 20. In the present embodiment, too, the position sensor 104 functions as means for detecting the injection amount M. Step W6-1 is followed by step W6-2 to read the material injecting time Ta represented by the content of the timer TimA. Then, step W6-3 is implemented to calculate maximum and minimum allowable injection amounts Mmax and Mmin on the basis of the material injection time Ta, and according to stored data maps or equations representative of predetermined relationships between the time Ta and amounts Mmax, Mmin as indicated in the graph of FIG. 28 by way of example. These maximum and minimum allowable injection amounts Mmax and Mmin are used as thresholds for monitoring the injection of the material 44, and the data maps or equations used to obtain these values Mmax, Mmin are determined by experiment or simulation on the basis of the injecting condition of the material 44 when the gasket fabricating system 110 is normal. The injection amount M increases as a function of the injecting time Ta. However, if there existed a leakage flow of the material 44 due to cracking or other damage of the elastic sealing members 60, 62 of the mold 56 or due to defective connection of the connecting tube 42 and connector 38, the injecting amount M would be larger than the optimum value. If the injection passage 34 was partly closed or plugged with a foreign matter, the injecting amount M would be smaller than the optimum value. Therefore, the optimum or allowable range (Mmax–Mmin) of the injecting amount M may be determined as a function of the material injection time Ta. The optimum range (Mmax–Mmin) accommodates a fluctuation associated with the material injection due to a variation of the viscosity of the material 44 and a variation of the characteristics of the specific mold 56 with respect to the nominal specifications.

Step W6-3 is followed by step W6-4 to determine whether the actual injecting amount M is equal to or smaller than the maximum allowable value Mmax. If the injecting amount M is held larger than the value Mmax for more than a predetermined time, the supply of the pressurized fluid to the drive cylinder 114 is interrupted in step W6-10, and the MATERIAL LEAKAGE light on the display 98 is turned on in step W6-11. Step W6-6 is provided to determine whether the injecting amount M is equal to or smaller than the minimum allowable value Mmin. If the injecting amount M is held smaller than the minimum value Mmin for more than a predetermined time, the supply of the pressurized fluid to the drive cylinder 114 is interrupted in step W6-14, and the ALARM light on the display 98 is turned on in step W6-15. Steps W6-5 and W6-7 through W6-15 in FIG. 27 are substantially the same as steps R5-5 and R5-7 through R5-15 in FIG. 20, respectively. However, threshold values N6 and N7 for counters C6 and C7 used in steps W6-9 and W6-13 may be the same as or different from the threshold values N4, N5 used in the sub-routine of FIG. 20.

If the actual injection amount M is in the allowable range between Mmax and Mmin, step W6-7 in the sub-routine of FIG. 27 is implemented, and then the control goes to step W7 of the main routine of FIG. 26. Step W7 is provided to determine whether the piston 50 has been elevated to the final position X1. Steps W5–W7 are repeatedly implemented to continue the injection of the material 44 until the piston 50 has been elevated to the final position X1. When the final position X1 is reached, step W8 is implemented to stop the supply of the pressurized fluid to the drive cylinder 114 to terminate the injection of the material 44, and turn on the CAVITY FULL light on the display 98. Step W7 may be effected in the preceding embodiments, too, to confirm that the piston 50 has been elevated to the final position X1, on the basis of the detected position X, namely, the detected injection amount M of the material 44. The present seventh embodiment may be modified such that the injection pressure PB detected by the pressure sensor 94 as provided in the system 100 of FIG. 18 is used to determine whether the piston 50 has been elevated to the final position X1, namely, the cavity 28 has been filled with the material 44. In the preceding sixth and the present seventh embodiments, the material injecting time Ta may be used to determine whether the cavity 28 has been filled with the material 44.

Like the preceding embodiment of FIGS. 19 and 20, the present embodiment permits early detection of any abnormality such as leakage of the material 44, plugging of the injection passage 34 or connecting tube 42 or defective connection of the injecting device 112 to the mold 56. It is also noted that the monitoring of the material injecting condition using the predetermined relationship between the injection time Ta and amount M eliminates the pressure sensor 94. It will be understood that a portion of the controller 118 assigned to implement step W6 of FIG. 26, i.e., sub-routine of FIG. 27 constitutes means for providing an indication of abnormality associated with the injection of the material 44. The data maps or equations used to calculate the maximum and minimum allowable injection amounts Mmax, Mmin represent the predetermined relationships between the injection time Ta and amount M. Although the present embodiment is also adapted to continuously monitor the injection of the material 44, it is possible to monitor the injecting amount M at selected value or values of the injecting time Ta. It is also possible to monitor the injection of the material 44 by determining whether the actual injecting time Ta is held between maximum and minimum allowable injecting times which are determined by the detected injecting amount M. The monitoring of the injecting amount M may be made using only one of the maximum and minimum allowable values Mmax and Mmin.

Figure 29:
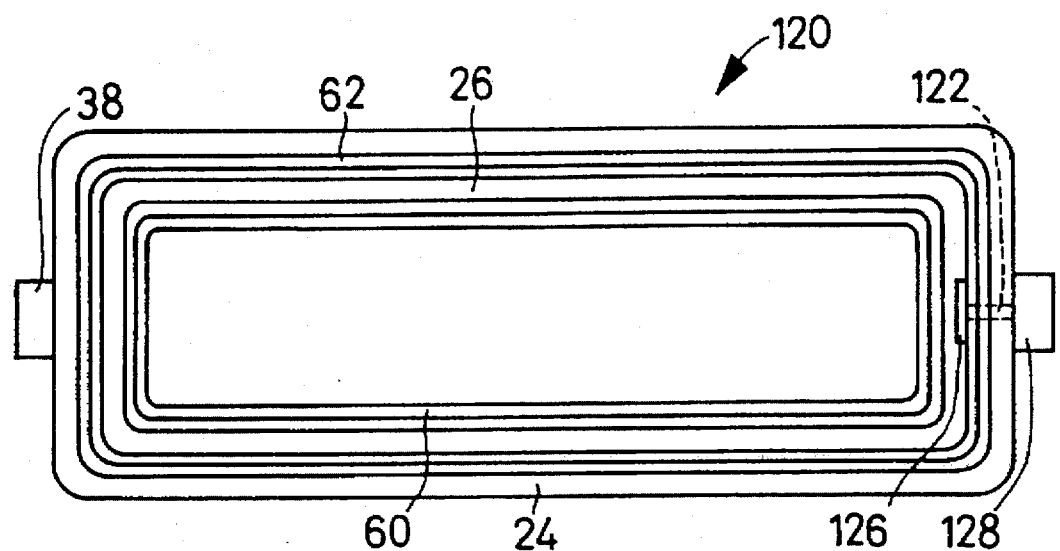
FIG. 29 is a bottom plan view showing a mold constructed according to yet another embodiment of the present invention.
Figure 30:
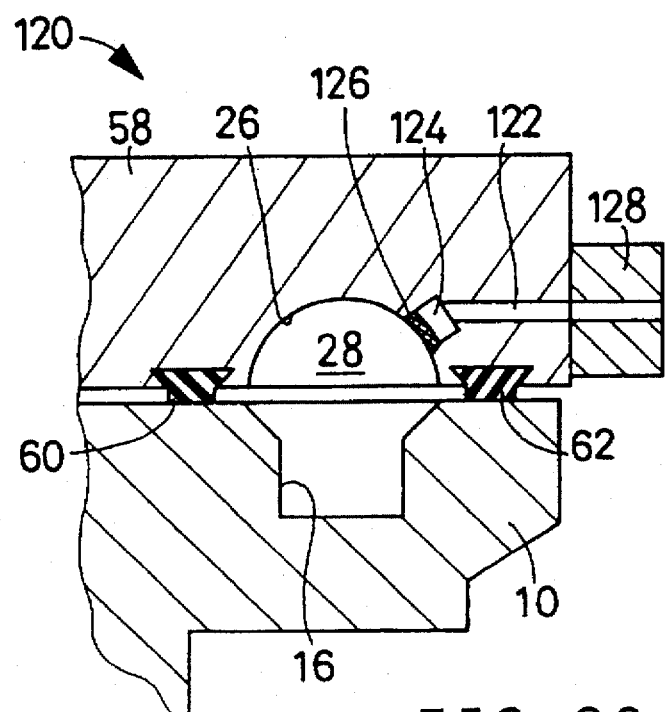
FIG. 30 is an elevational view in cross section of the mold of FIG. 29 as superposed on an engine head cover, showing an air exhaust passage formed through the mold.

Referring next to FIGS. 29 and 30, there is shown a mold 120 which is suitably used in place of the mold 20 in the gasket fabricating process of FIGS. 1(a) through 1(e). The mold 120 is different from the mold 56 of FIGS. 7–9, in that the body 58 of the mold 120 has an air exhaust passage 122 and a filter 126. The air exhaust passage 122 is open at one end thereof to a portion of the gasket-forming groove 26 to which the material flowing from the injection passage 34 reaches last. Usually, that portion is most distant from the connector 38 (from the injection passage 34 as shown in FIGS. 3 and 4), as measured along the gasket-forming groove 26. The air exhaust passage 122 is located opposite to a portion of the groove 26 to which the injection passage 34 is connected. Described more specifically, when the material 44 is injected into the cavity 28 through connector 38 and injection passage 34, there arise two flows of the injected material 44 through respective two parts of the groove 26 or cavity 28, beginning from one end of the cavity 28 as seen in the longitudinal direction of the mold 120, and the two flows eventually merge or meet with each other at the other end of the cavity 28. Thus, air remains to exist at this other end of the cavity 28 by the time just before the cavity is filled with the material 44. The air exhaust passage 122 is open at this other end of the cavity 28 (corresponding end of the groove 26). The passage 122 is open to the ambient atmosphere through a connector 128. The mold 120 has a recess 124 which is open to the groove 26 and which communicates with the inner end of the passage 122. The recess 124 has a length of about 5 mm and a width of about 1 mm. The air exhaust passage 122 is open to the bottom of the recess 124. The filter 126 indicated above fills a portion of the recess 124 which is adjacent to the groove 26 and which is remote from the opening of the passage 122. The filter 126 permits a flow of air but inhibits a flow of the material 44 therethrough. In other words, the filter 126 define a part of the surface defining the groove 26.

Figure 31:
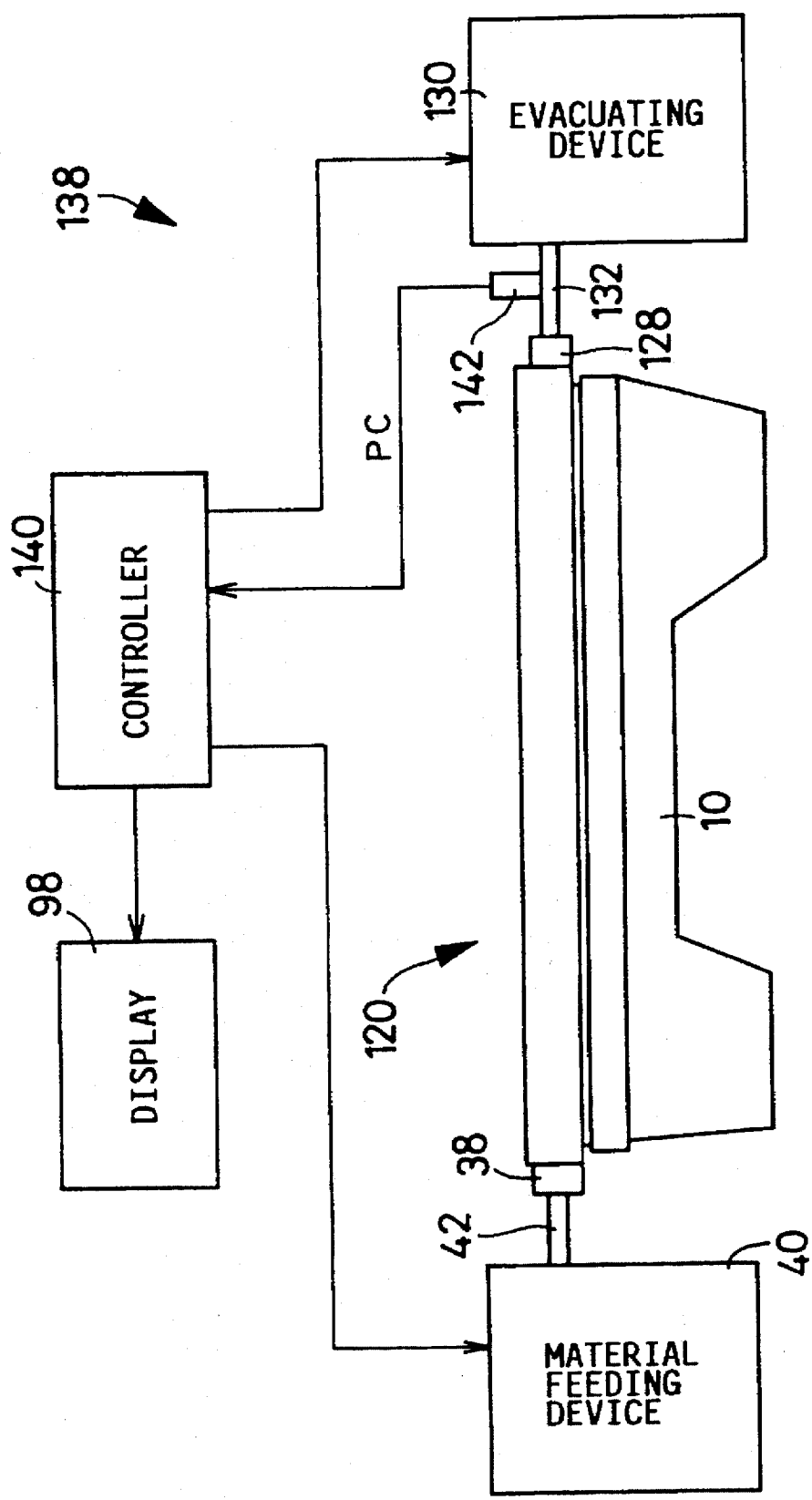
FIG. 31 is a view depicting a gasket fabricating system which uses the mold of FIG. 29.

For instance, the filter 126 consists of a porous metal or ceramic such as aluminum or zinc having pores of about 100 angstroms, or a metal fiber felt. The connector 128 is connectable to a connecting tube 132 of an evacuating device 130 used in a gasket fabricating system 138 shown in FIG. 31, or a connecting tube 136 of a compressor 134 shown in FIG. 34. Although the mold 120 is a modification of the mold 56 having the elastic sealing members 60, 62, the principle of the mold 120 is equally applicable to the mold 20 or 66.

The gasket fabricating system 138 indicated above is constructed according to a ninth embodiment of the present invention, and is suitably used to practice the process of the invention. In operation, the mold 120 is clamped to the head cover 10 by the fixture 22, and the connecting tube 42 of the material feeding device 40 is connected to the connector 38 of the mold 120, while the connecting tube 132 of the evacuating device 130 is connected to the connector 128 of the mold 120. For example, the evacuating device 130 includes a vacuum pump adapted to evacuate the cavity 28 through the air exhaust passage 122. The evacuating device 130 is controlled according to a signal received from a controller 140. A pressure sensor 142 is provided for detecting a pressure PC within the cavity 28. The signal indicative of this pressure PC is fed to the controller 140. Described more precisely, the pressure sensor 142 detects the pressure within the connecting tube 132, which may differ only slightly from the pressure PC within the cavity 28, unless the filter 126 is heavily clogged or plugged. Therefore, the pressure detected by the pressure sensor 142 can be considered to be the pressure PC within the cavity 28. Like the pressure sensor 96, the pressure sensor 142 may be a thin-film type pressure sensor in which a piezoelectric element or strain gage is disposed on a thin film which deforms depending upon a difference between the pressure to be detected and the atmospheric pressure.

Figure 32:
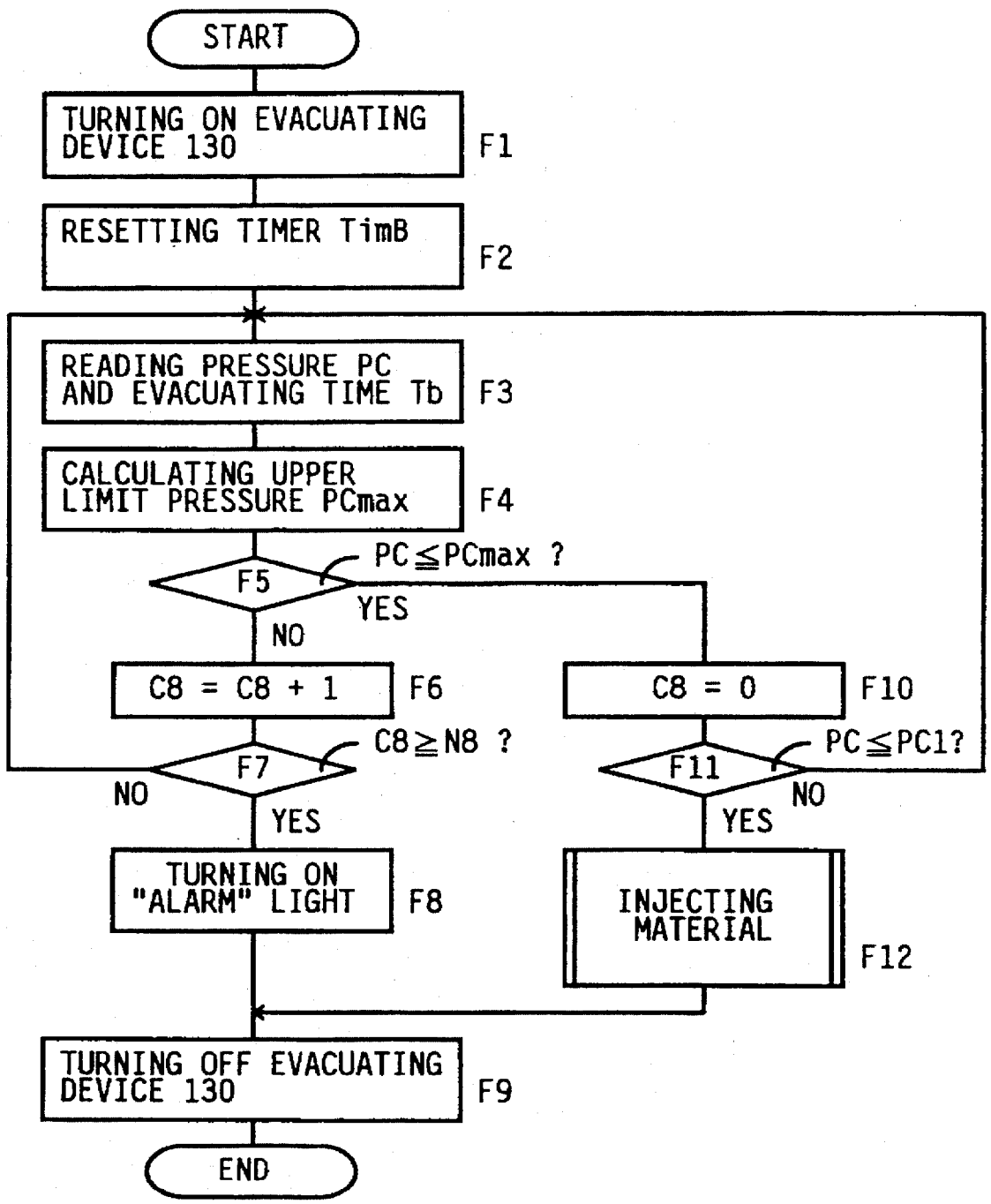
FIG. 32 is a flow chart illustrating an operation of the system of FIG. 31.
Figure 33:
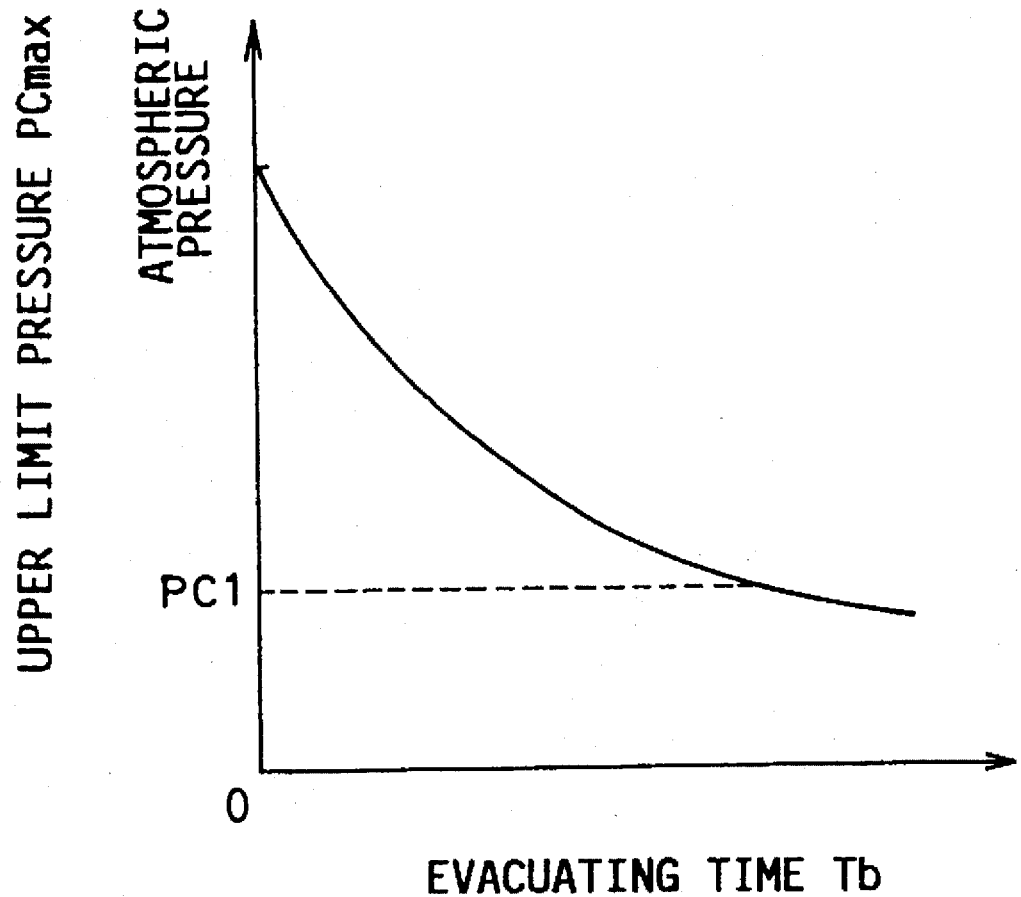
FIG. 33 is a graph indicating an example of a data map used in step F4 of FIG. 32 to calculate upper limit pressure PCmax.

Like the controller 92, the controller 140 incorporates a microcomputer, which is adapted to execute a routine illustrated in the flow chart of FIG. 32 to inject the material 44 into the cavity 28 while the cavity is evacuated. When a start switch is turned on, the routine is initiated with step F1 to turn on the evacuating device 130 to evacuate the cavity 28. Step F1 is followed by step F2 to reset a timer TimB to start measuring an evacuating time Tb, that is, the time after the evacuating device 130 is started. The timer TimB may be a timer circuit incorporating a crystal oscillator. The timer TimB may be replaced by a counter adapted to count the number of repeated implementation of a series of steps at a predetermined constant cycle time. Step F2 is followed by step F3 to read the pressure PC within the cavity 28 represented by the signal received from the pressure sensor 142, and the evacuating time Tb represented by the content of the timer TimB. Then, step F4 is implemented to calculate an upper limit pressure PCmax on the basis of the evacuating time Tb and according to a stored data map or equation representative of a predetermined relationship between the values PCmax and Tb as indicated by the graph of FIG. 33 by way of example. The upper limit pressure level PCmax is a threshold used for determining whether the cavity 28 is normally evacuated by the evacuating device 130. The data map or equation used to calculate the value PCmax is determined by experiment or simulation on the basis of the evacuating condition of the cavity 28 when the system 138 is normal. The pressure PC decreases as a function of the evacuating time Tb. However, if there existed a leakage flow of the material 44 due to cracking or other damage of the elastic sealing members 60, 62 of the mold 56 or due to defective connection of the connecting tube 132 and connector 128, the pressure PC would be higher than the optimum level. Therefore, the upper limit pressure PCmax may be determined as a function of the evacuating time Tb.

Step F4 is followed by step F5 to determine whether the detected pressure PC is equal to or lower than the upper limit level PCmax. If an affirmative decision (YES) is obtained in step F5, step F10 is implemented. If a negative decision (NO) is obtained in step F5, the control flow goes to step F6 to increment a counter 8, and step F7 to determine whether the content of the counter C8 has reached a predetermined number N8. The counter C8 is reset to "0" immediately after the start of the routine or in step F10, and counts the number of implementation of step F6 after the negative decision (NO) is obtained for the first time in step F5. Steps F6 and F7 are provided to determine whether the pressure PC higher than the upper limit PCmax is of a temporary nature due to fluctuating factors associated with the evacuating device 130, or of a permanent nature due to air leakage from the cavity 28 or related evacuating system which includes the device 130. The threshold N8 may be a constant value determined on the basis of a variation associated with the evacuating condition when the system 138 including the evacuating system is normal. While the count of the counter C8 is smaller than the threshold N8, the control flow goes to step F3. Steps F3–F7 are repeatedly implemented to continue the evacuation of the cavity 28. If an affirmative decision (YES) is obtained in step F7, the ALARM light on the display 98 is turned on in step F8, and the evacuating device 130 is turned off in step F9 to interrupt the evacuation of the cavity 28.

If an affirmative decision (YES) is obtained in step F5, that is, the pressure PC is not higher than the upper limit PCmax, step F10 is implemented to reset the counter C8 to "0", and step F11 is then implemented to determine whether the pressure PC is equal to or lower than a predetermined level PC1. Step F11 is provided to determine whether the cavity 28 is evacuated to a desired pressure level that prevents air voids within the gasket 12 to be formed. The predetermined level PC1 may be selected to be about 100 mbar ($1\times10^4$Pa). While the pressure PC is higher than the predetermined level PC1, steps F3–F5 and F10–F11 are repeatedly implemented to continue the evacuation of the cavity 28. When the pressure is lowered to the predetermined level PC1, step F12 is implemented to turn on the material feeding device 40 to start the injection of the material 44 into the cavity 28. The evacuating device 130 is kept operated even after the affirmative decision (YES) is obtained in step F11, and turned off in step F9 when the cavity 28 is filled with the material 44.

Figure 34:
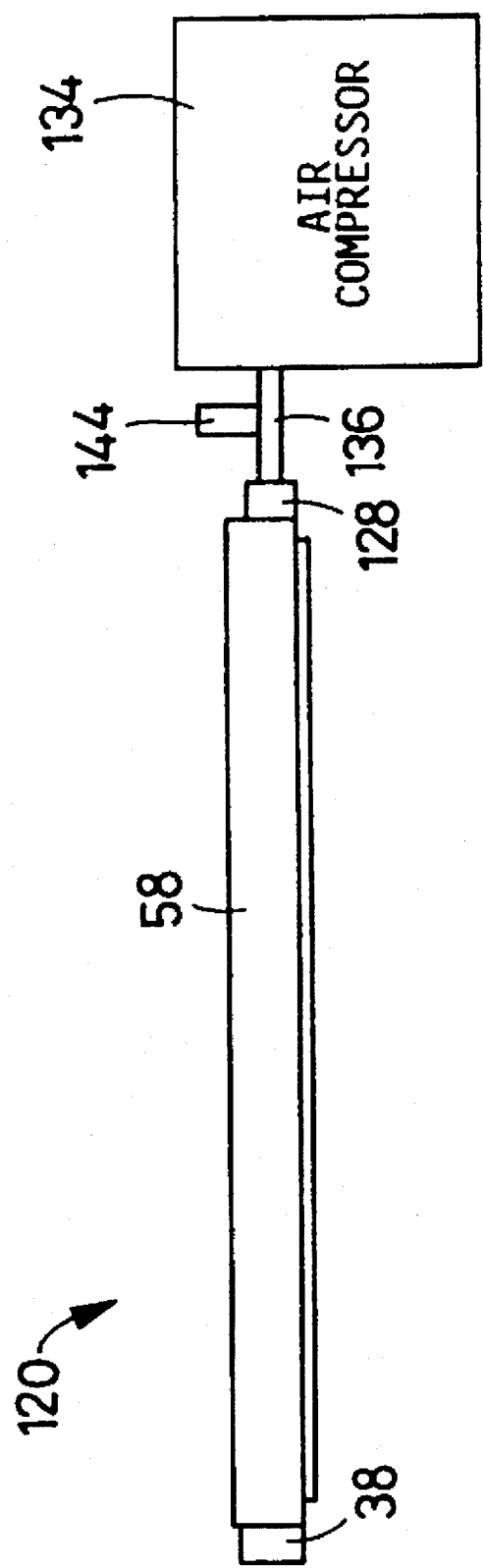
FIG. 34 is a front elevational view showing an air compressor connected to the mold in the system of FIG. 31, after the injected material in the mold is cured.

After the cavity 28 is filled with the material 44 in the gasket fabricating system 138, the material feeding device 40 and evacuating device 130 are disconnected from the mold 120 while the mold 120 is held clamped to the head cover 10 by the internal force type fixture 22. The material 44 is then cured in the curing device 52. The mold 120 is removed from the head cover 10, and is connected at its connector 128 to the air compressor 134 as shown in FIG. 34, so that the material 44 left on the filter 126 is removed by the compressed air. At this time, the pressure in the connecting tube 136 is detected by a pressure sensor 144 connected to the connecting tube 136, to confirm that the detected pressure is lowered below a predetermined level, which indicates complete removal of the material 44 from the filter 126. Although this operation to clean the filter 126 may be effected under the control of the controller 140, the operation may be effected manually. In this case, the compressor 134 is turned on by the operator using a suitable switch, and turned off by the switch when the operator visually confirms that the pressure detected by the pressure sensor 144 is lowered below the predetermined level. The mold 120 is then coated with a mold release agent at the gasket-forming groove 26, and returned to the mold clamping station for use with the next workpiece 10.

In the present gasket fabricating system 138, the mold 120 is clamped to the joining surface 14 of the head cover 10, and the cavity 28 formed therebetween is evacuated until the pressure PC within the cavity 28 is lowered to the predetermined level PC1. Then, the material feeding device 40 is activated to inject the material 44 into the cavity 28, so that the gasket 12 is simultaneously formed in the cavity 28 and fixed in the fixing groove 16 formed in the head cover 10. Thus, the present system 138 have substantially the same advantage as the systems previously discussed. It is also noted that the elastic sealing members 60, 62 disposed on both inner and outer sides of the gasket-forming groove 26 assure sufficient pressure-tight sealing between the mold 120 and the head cover 10, without an excessively large clamping pressure, as in the embodiment using the mold 56.

While the pressure-tight sealing of the cavity 28 means relatively difficult discharge of the air from the cavity 28 and relatively easy formation of air voids within the gasket 12, the positive evacuation of the cavity 28 by the evacuating device 130 facilitates the filling of the cavity 28 with the material 44 without the air left therein, and minimizes the risk of formation of the air voids in the gasket due to the air left in the cavity 28. It will be understood that a portion of the controller 140 assigned to implement steps F1–F11 constitutes means for evacuating the cavity 28. Although the present system 138 is adapted to start the injection of the material 44 only after the pressure PC within the cavity 28 is lowered below the predetermined level, the evacuating device 130 may be turned on simultaneously with the material feeding device 40, for correct evacuation and material filling of the cavity 28.

As described above, the ALARM light on the display 98 is turned on and the evacuation of the cavity 28 by the evacuating device 130 is interrupted if the pressure PC within the cavity 28 is held higher than the upper limit PCmax (determined by the injecting time Tb) for more than a predetermined time, namely, if the count of the counter C8 has reached the predetermined number N8. This arrangement permits early detection of air leakage due to damage of the elastic sealing members 60, 62, and prevents reduction of the yield ratio of the material 44 due to subsequent leakage of the material 44 and defects of the gasket 12. The data map or equation used to calculate the upper limit PCmax represents a predetermined relationship between the pressure PC and the injecting time Tb. While the pressure in the cavity 28 is continuously monitored during evacuation thereof, the pressure PC may be monitored at selected values of the injecting time Tb. Further, the filter 126 may be monitored for clogging, by determining whether the pressure PC is held within an allowable range defined by the upper limit PCmax and a lower limit PCmin. It is also possible to monitor the evacuation of the cavity 28 by determining whether the actual injecting time Tb is shorter than a maximum allowable injecting time that is determined by the pressure PC.

The mold 120 has the filter 126 disposed at the position of communication between the air exhaust passage 122 and the gasket-forming groove 26. The filter 126 prevents the leakage of the material 44 through the air exhaust passage 122, and accordingly improves the yield ratio of the material 44. The provision of the filter 126 also permits the air exhaust passage 122 to have a large opening (about 5 mm long) at the connection to the groove 26, whereby the cavity 28 can be evacuated with high efficiency even if the position of the portion of the cavity 28 which is last filled with the material 44 considerably fluctuates. Since the air exhaust passage 122 is open to that last filled portion of the cavity 28, the cavity 28 can be evacuated as the material 44 is injected into the cavity 28, without positive evacuation by the device 130, while the present embodiment is adapted to activate the device 130 prior to the injection of the material 44. In this embodiment, the connection of the air exhaust passage 122 to the last filled portion of the cavity 28 is desirable but not essential.

While the present invention has been described in detail in its presently preferred embodiments with certain degrees of particularity in various aspects, it is to be understood that the invention is not confined to the details of the illustrated embodiments, but may be embodied otherwise.

For instance, the principle of the present invention is equally applicable to the formation of the gasket 12 on any component other than the head cover 10, such as a transmission casing, an oil pan, and other parts which require a comparatively high degree of fluid- or pressure-tightness with respect to the mating part.

Although the material feeding devices 40, 88, 112 all use the feed cylinder 46 for forcing the material 44 into the cavity 28, the present invention may use other types of material feeding device, such as a device in which a screw having a helical vane or vanes is rotated by suitable drive means.

While the gasket-forming groove 26 has a semi-circular cross sectional shape in the illustrated embodiments, the shape of the groove 26 may be modified as needed. Similarly, the cross sectional shape of the gasket-fixing groove 16 may be modified as needed.

It is to be understood that the present invention may be embodied with various other changes, modifications and improvements, which may occur to those skilled in the art, in the light of the foregoing teachings.

What is claimed is:

1. A process of forming a gasket directly on a workpiece having a joining surface which has an annular gasket-fixing groove, comprising the steps of:

preparing a mold having a gasket-forming groove which cooperates with said gasket-fixing groove to define a cavity for forming said gasket, said mold further having a fluid passage;

clamping said mold to said joining surface of said workpiece;

injecting a material for the gasket into said cavity through an injection passage which is formed through said mold and which communicates with said gasket-forming groove;

curing said material injected in said cavity;

removing said mold from said workpiece;

attaching inner and outer elastic tubes to a body of said mold such that said inner and outer elastic tubes communicate with said fluid passage and are disposed on inner and outer sides of said gasket-forming groove, respectively, so as to extend peripherally along said gasket-forming groove, said step of clamping said mold comprising clamping said body of said mold to said joining surface of said workpiece such that said inner and outer elastic tubes are held in elastic pressure-tight contact with said joining surface of said workpiece;

connecting a pressurized-fluid supply device to said fluid passage of said body, for supplying said elastic tubes with a pressurized fluid;

detecting a pressure of said pressurized fluid in said elastic tubes;

detecting an injection pressure of said material; and controlling at least one of said pressurized-fluid supply device and a material feeding device for injecting said material into said cavity through said injection passage, such that the detected pressure of said pressurized fluid and the detected injection pressure of said material increase, during an operation of said material feeding device, so as to maintain a predetermined relationship therebetween without leakage of said material from said cavity.

2. A process according to claim 1, further comprising the steps of:

detecting an amount of injection of said material into said cavity through said injection passage; and determining whether the detected injection pressure of said material and the detected amount of injection of said material into said cavity satisfy a predetermined relationship, and providing an indication of abnormality associated with the injection of said material if said predetermined relationship is not satisfied.

3. A process according to claim 1, further comprising the steps of:

measuring an injection time of said material which has passed after an operation of injection of said material into said cavity through said injection passage is started; and determining whether the detected injection pressure of said material and the measured injection time satisfy a predetermined relationship, and providing an indication of abnormality associated with the injection of said material if said predetermined relationship is not satisfied.

4. A process according to claim 1, further comprising the steps of:

detecting an amount of injection of said material into said cavity through said injection passage;

measuring an injection time of said material which has passed after an operation of injection of said material into said cavity is started; and determining whether the detected amount of injection of said material and the measured injection time satisfy a predetermined relationship, and providing an indication of abnormality associated with the injection of said material if said predetermined relationship is not satisfied.

* * * * *